United States Patent [19]

Suzuki et al.

[11] Patent Number: 5,223,982
[45] Date of Patent: Jun. 29, 1993

[54] OBJECTIVE LENS SYSTEM FOR ENDOSCOPES

[75] Inventors: Takayuki Suzuki; Susumu Takahashi; Kimihiko Nishioka, all of Tokyo, Japan

[73] Assignee: Olympus Optical Co., Ltd., Tokyo, Japan

[21] Appl. No.: 845,944

[22] Filed: Mar. 4, 1992

[30] Foreign Application Priority Data

Mar. 5, 1991 [JP] Japan .................................. 3-062394
May 13, 1991 [JP] Japan .................................. 3-135304

[51] Int. Cl.$^5$ ................................................ G02B 3/02
[52] U.S. Cl. ...................................... 359/716; 359/708; 359/784
[58] Field of Search ............... 359/661, 708, 716, 740, 359/784, 790, 782

[56] References Cited

U.S. PATENT DOCUMENTS 4,674,844 6/1987 Nishioka et al. ..................... 359/708
4,806,001 2/1989 Okabe et al. ......................... 359/708
5,119,238 6/1992 Iganashi ............................... 359/716

FOREIGN PATENT DOCUMENTS 61-162021 7/1986 Japan .
2-208617 8/1990 Japan .
2-293709 12/1990 Japan .

Primary Examiner—Bruce Y. Arnold
Assistant Examiner—James Phan
Attorney, Agent, or Firm—Cushman, Darby & Cushman

[57] ABSTRACT

An objective lens system for endoscopes comprising, in order from the object side, a first lens unit having negative refractive power, a second lens unit having positive refractive power and a third lens unit having positive refractive power; wherein astigmatism is corrected favorably by using an aspherical surface in the third lens unit or an aperture stop is arranged between the second lens unit and an image surface of the objective lens system, and aberrations including chromatic aberration are corrected favorably.

5 Claims, 18 Drawing Sheets

OBJECTIVE LENS SYSTEM FOR ENDOSCOPES

BACKGROUND OF THE INVENTION

1. Field of the Invention

The present invention relates to an objective lens system which is suited for use with endoscopes and composed of a small number of lens elements.

2. Description of the Prior Art

As an objective lens system which has favorably corrected distortion and a simple composition consisting of a relatively small number of lens elements, there is known a lens system disclosed by Japanese Patent Kokai Publication No. Sho 61-162,021. However, this objective lens system has a small field angle and curvature of field which is not corrected favorably since no concave lens element is comprised therein.

Further, as objective lens systems for endoscopes which have large field angles, there are known lens systems proposed by Japanese Patent Kokai Publication No. Hei 2-293,709 and so on. However, each of these lens systems consists of a large number of lens elements, uses an aperture stop which is arranged between a first lens unit having negative power and a second lens unit having positive refractive power, and comprises a cemented lens component which is arranged after the aperture stop. This lens system selects the composition described above for the purpose of correcting, by using lens components arranged after the aperture stop, aberrations which are produced more remarkably by the first lens unit as the objective lens system has a larger field angle. The cemented lens component is arranged after the aperture stop especially for correcting lateral chromatic aberration.

Since this objective lens system has the composition which is complicated as described above, it is composed of the large number of lens elements and inevitably requires a high manufacturing cost.

It an attempt is made to simplify the composition of this objective lens system by reducing the number of the lens elements, each lens component must have strengthened power and will aggravate aberrations, whereby the objective lens system must have a prolonged total length for correcting the aberrations or cannot be compact and will be unsuited for use with endoscopes.

Further, if the cemented lens component which is arranged after the aperture stop in the objective lens system described above is designed as a single-element lens component, the lens system will be incapable of correcting the lateral chromatic aberration.

An objective lens system for endoscopes disclosed by Japanese Patent Kokai Publication No. Hei 2-208,617, for example, has a relatively large field angle and a simple composition, but has a field angle on the order of 70°. If this objective lens system for endoscopes is modified so as to have a larger field angle (80° to 140°), this lens system will be incapable of correcting aberrations sufficiently favorably. An objective lens system for endoscopes which is composed of three lens elements, preferred as an embodiment of the lens system disclosed by Japanese Patent Kokai Publication No. Hei 2-208,617, in particular, allows the lateral chromatic aberration to be produced by individual lens components in the same direction and cannot therefore be said as an objective lens system having chromatic aberration corrected sufficiently favorably.

SUMMARY OF THE INVENTION

A primary object of the present invention is to provide an objective lens system for endoscopes which is compact, and has a large field angle and favorably corrected astigmatism.

Another object of the present invention is to provide an objective lens system for endoscopes which is compact and has favorably corrected aberrations including chromatic aberration.

An objective lens system for endoscopes which can accomplish the primary object of the present invention comprises a first lens unit having negative refractive power, a second lens unit having positive refractive power and a third lens unit having positive refractive power, and satisfies the following conditions (1) and (2):

$$0.05 < |A_{2SP}/A_{3AS}| < 20 \tag{1}$$

$$A_{2SP} < 0, A_{3AS} > 0 \tag{2}$$

wherein the reference symbol $A_{2SP}$ represents a quotient obtained by dividing an astigmatism coefficient of the third order of spherical surfaces of the second lens unit by an F number, and the reference symbol $A_{3AS}$ designates a quotient obtained by dividing an astigmatism coefficient of the third order of an aspherical surface of the third lens unit by the F number.

The objective lens system for endoscopes according to the present invention has a composition, for example as shown in FIG. 1, wherein the lens system is composed of a first lens unit $L_1$, a second lens unit $L_2$ and a third lens unit $L_3$, and an aperture stop S is arranged between the first lens unit $L_1$ and the second lens unit $L_2$ at a location in the vicinity of a front focal point of a total lens system composed of the second lens unit and the third lens unit so that a principal ray is allowed to be incident on an image guide IG in parallel with an optical axis thereof. The objective lens system according to the present invention may be used not only with fiber scopes but also with electronic endoscopes using image pickup devices such as solid-state image sensors.

The third lens unit $L_3$ is arranged in the vicinity of a location at which an image pickup device is to be arranged so as to allow to simplify a structure of a frame for supporting the third lens unit $L_3$ by integrating this lens unit with the image pickup device.

Further, the third lens unit $L_3$ comprises the aspherical surface as described above which is adopted for correcting distortion in the objective lens system and has a shape including portions whose converging function is weakened as the portions are farther from an optical axis of the objective lens system.

When the optical axis is taken as the x axis assuming the direction toward an image to be positive, an intersection between the aspherical surface and the optical axis is taken as an origin, and a direction perpendicular to the optical axis is taken as the y axis, and ordinate and abscissa values are represented by x and y respectively, the shape of the aspherical surface is expressed by the following formula:

$$x = \frac{y^2/r}{1 + \sqrt{1 - p(y/r)^2}} + By^2 + Ey^4 + Fy^6 + Gy^8 +$$

$$Hy^{10} + Iy^{12} + \ldots$$

wherein the reference symbol r represents a radius of curvature on a circle which is in contact with the aspherical surface in the vicinity of the optical axis, the reference symbol p designates a conical constant, and the reference symbols B, E, F, G, H, I, ... denote aspherical surface coefficients of the second, fourth, sixth, eighth, tenth, twelfth, ... orders respectively. The formula mentioned above expresses a spherical surface when p has a value of 1, and all of B, E, F, G, H, I, ... have a value of 0.

Description will be made below on an assumption that both p and B have a value of 1.

For correcting astigmatism (astigmatic difference), the aspherical surface to be used in the objective lens system for endoscopes according to the present invention should desirably satisfy the relationship expressed by the following formula:

$$A_{2SP} + A_{3SP} \approx 0$$

Now, significance of the above-mentioned conditions (1) and (2) will be described below.

Let us define Seidel's aberration coefficients by a formula to be described a little later which is substantially the same as that adopted for multi-purpose lens design program ACCOS-V. When an object distance is represented by OB, a numerical aperture of a marginal ray is designated by NA and a refractive index of a medium located on the object side of a first surface of the objective lens system is denoted by $n_0$, ACCOS-V defines a height of ray $H_0$ on the first surface of the objective lens system by the following formula:

$$H_0 = OB \times \tan\{\sin^{-1}(NA/n_0)\}$$

In contrast, the present invention defines $H_0$ as follows:

$$H_0 = OB \times (NA/n_0)$$

Accordingly, the present invention determines the aberration coefficients by paraxial tracing on the basis of $H_0$ given by the latter formula:

For meridional ray (X = 0)

$$\Delta Y = (SA3)H^3 + (CMA3)Y^1H^2 + \{3(AST3) + (PTZ3)\}Y^2H + $$
$$(DIS3)Y^3 + (SA5)H^5 + (CMA5)YH^4 + (TOBSA)Y^2H^3 + $$
$$(ELCMA)Y^3H^2 + \{5(AST5) + (PTZ5)\}Y^4H + (DIS5)Y^5 + $$
$$(SA7)H^7 \ldots$$

For sagittal ray (Y = 0)

$$\Delta Z = (SA3)H^3 + \{(AST3) + (PTZ3)\}Z^2H + (SA5)H^5 + $$
$$(SOBSA)Z^2H^3 + \{(AST5) + (PTZ5)\}Z^4H + (SA7)H^7 \ldots$$

For the formula expressing $\Delta Y$, a deviation between a paraxial image point (an image point of an ideal aberration-free lens system) and an actual image point for the meridional ray is represented by $\Delta Y$. In this formula, the reference symbol Y represents a location of incidence of a paraxial principal ray as measured on an image plane which is normalized to a maximum image height and the reference symbol H designates a location of incidence of a marginal ray as measured on a surface of pupil which is normalized to a diameter of pupil. Further, the reference symbols SA3, SA5 and SA7 denote spherical aberration coefficients of the third, fifth and seventh orders respectively, the reference symbols CMA3 and CMA5 represent tangential coma coefficients of the third and fifth orders respectively, the reference symbols AST3 and AST5 designate astigmatism coefficients of the third and fifth orders respectively, the reference symbols PTZ3 and PTZ5 denote Petzval's sum coefficients of the third and fifth orders respectively the reference symbols DIS3 and DIS5 represent distortion coefficients of the third and fifth orders respectively, the reference symbol TOBSA designates spherical aberration coefficient of the fifth order in an oblique direction, the reference symbol ELCMA denotes an elliptic coma coefficient of the fifth order, and the reference symbol SOBSA represents a sagittal spherical aberration coefficient of the fifth order in the oblique direction.

When the objective lens system comprises the spherical surfaces and the aspherical surface, the astigmatism coefficient AST3 of the third order is expressed as follows:

$$AST3 = (A_{1SP} + A_{2SP} + A_{3SP} + A_{1AS} + A_{2AS} + A_{3AS})F$$

wherein the reference symbol $A_{jSP}$ represents the astigmatism coefficient of the third order of spherical portions of a j'th lens unit and the reference symbol $A_{jAS}$ designates the astigmatism coefficient of the third order of aspherical portions of the j'th lens unit.

The aberration coefficients of the spherical portions mean those of a spherical surface when a surface of interest is a spherical surface or those of a spherical surface which is in contact with an aspherical surface (reference sphere) when a surface of interest is an aspherical surface. Further, the aberration coefficients of the aspherical portions means differences obtained by subtracting the aberration coefficients of the reference sphere from those of the aspherical surface. Furthermore the above-mentioned formula expressing AST3 contains all the aberration coefficients of all the lens units including the lens units which comprise no aspherical surface and have a value of $A_{jAS}$ of 0.

The objective lens system for endoscopes according to the present invention has large values of $A_{2SP}$ and $A_{3SP}$, and is capable of correcting astigmatism by cancelling $A_{2SP}$ and $A_{3SP}$ with each other. The conditions (1) and (2) are required for cancelling $A_{2SP}$ with $A_{3SP}$.

If the upper limit of the condition (1) is exceeded, a sagittal image surface will tend to incline remarkably on the positive side relative to a meridional image surface ($\Delta m$), thereby aggravating astigmatic difference. If the lower limit of the condition (1) is exceeded, a reverse tendency is produced, thereby aggravating the astigmatic difference.

Further, $A_{2SP}$ and $A_{3AP}$ are expressed as follows by using design factors for the objective lens system, i.e., heights of paraxial rays, angles of incidence of the paraxial rays and angles of emergence of the paraxial rays on each lens surface as well as refractive indices and an aspherical surface coefficient of the fourth order of each lens surface:

$$A_{3AS} = \Sigma \, 8(h_{ai})^2 \cdot (h_{bi})^2 \cdot E_i(N_i - N_{i+1})$$

wherein the reference symbol $h_{ai}$ represents a height of a paraxial marginal ray as measured on an i'th surface, the reference symbol $h_b$ designates a height of a paraxial principal ray as measured on the i'th surface, the reference symbol $E_i$ denotes the aspherical surface coefficient of the fourth order of the i'th surface, the reference symbol $N_i$ represents a refractive index of a medium located on the object side of the i'th surface, the reference symbol $N_{i+1}$ designates a refractive index of a medium located on the image side of the i'th surface and the reference symbol $\Sigma$ means a total sum of all products of all the factors of the aspherical surface used in the third lens unit. Further, $$A_{2SP} = \Sigma A_{2SPi} = \Sigma S_i(I' \cdot 1)^2$$

$$S_i = N_i(K_i - 1) \cdot h_{ai}(I_i + u_i)$$

$$K_i = N_i/N_{i+1}$$

wherein $A_{2SPi}$ is defined as $S_i(I_i)^2$, and the reference symbol $I_i$ represents an angle of incidence of the paraxial marginal ray as measured on the i'th surface, the reference symbol $u_i$ designates an inclination angle of the paraxial marginal ray emerging from the i'th surface as measured relative to the optical axis and the reference symbol $I'$ denotes an angle of incidence of the paraxial principal ray incident on the i'th surface. Furthermore, the reference symbol $\Sigma$ means a total sum of all products of the factors of all the spherical surfaces used in the second lens unit. In addition, a clockwise direction around the optical axis is considered as positive for all of $I_i$, $u_i$, $I_i'$ and $u_i'$.

In the next place, it is desirable for correcting distortion more favorably to use an aspherical surface also in the first lens unit. The aspherical surface to be used in the first lens unit should desirably include portions which have a converging function progressively strengthened as values of y increase when $N_i$ is smaller than $N_{i+1}$, or portions which have a diverging or converging function progressively weakened or strengthened as values of y decrease when $N_i$ is larger than $N_{i+1}$. Let us designate this aspherical surface including the portions described above as No. 1. When the aspherical surfaces used in the first lens unit and the third lens unit have the aspherical surface coefficient of the fourth order, $A_{1AS}$ and $A_{3AS}$ are expressed as follows respectively:

$$A_{1AS} = \Sigma 8(h_{ai})^2 \cdot (h_{bi})^2 \cdot E_l(N_l - N_{l=1})$$

$$A_{3AS} = \Sigma 8(h_{ai})^2 \cdot (h_{bi})^2 \cdot E_i(N_i - N_{1+1})$$

$$A_{1AS} < 0$$

$$A_{3AS} > 0$$

In this case, it is necessary for the objective lens system for endoscopes according to the present invention to satisfy the following condition (3) in place of the above-mentioned condition (1):

$$0.005 < |A_{1AS}/A_{3AS}| < 5 \quad (3)$$

If the condition (3) is not satisfied, $|A_{1AS} + A_{3AS} + A_{2SP}|$ has a large value, thereby making it difficult to correct the astigmatism.

On the basis of the fact described above, it is desirable for correction of astigmatism that the objective lens system for endoscopes according to the present invention satisfies the following condition (4) when this lens system uses the aspherical surfaces in both the first lens unit and the third lens unit respectively:

$$0.055 < |(A_{2SP} + A_{1AS})/A_{3AS}| < 25 \quad (4)$$

Now, description will be made of an objective lens system for endoscopes which can accomplish the second object of the present invention. This objective lens system comprises, like the objective lens system already described above, a first lens unit having negative refractive power, a second lens unit having positive refractive power and a third lens unit having positive refractive power, and is characterized in that it satisfies the following conditions (5) and (6):

$$5 > |f_1/f_2| > 0.03 \quad (5)$$

$$d/f < 5 \quad (6)$$

wherein the reference symbols $f_1$ and $f_2$ represents focal lengths of the first lens unit and the second lens unit respectively, the reference symbol f designates a focal length of the objective lens system as a whole, and the reference symbol d denotes a distance as measured between principal points of the second lens unit and the third lens unit.

In this objective lens system, the aperture stop is arranged between the second lens unit and the image point of the lens system. In embodiments of the objective lens system for endoscopes according to the present invention to be described later, the aperture stop is arranged between the second lens unit and the third lens unit in each of the ninth through eleventh embodiments, whereas the aperture stop is disposed between the third lens unit and the image plane of the lens system in each of the seventh, eighth and twelfth embodiments.

When the aperture stop is arranged between the second lens unit and the third lens unit or between the third lens unit and the image plane, at least one lens element having positive refractive power is arranged on the object side of the aperture stop and this lens element having positive refractive power functions to produce lateral chromatic aberration in such a direction as to cancell lateral chromatic aberration which is produced by the first lens unit having the negative refractive power, thereby making it unnecessary to use a cemented lens component which is conventionally used for correcting the lateral chromatic aberration or making it possible to simplify a composition of an objective lens system for endoscopes.

Further, aberrations other than the lateral chromatic aberration can be corrected favorably by selecting optimum directions of lens surfaces in combination with an adequate power distribution among lens elements.

Furthermore, when the first lens unit has an image side surface which has high curvature and a center of curvature located on the image side of this surface as in the case of the seventh or eighth embodiment, astigmatism and coma to be produced by this surface is aggravated as the objective lens system has a larger field angle. For this reason, astigmatism and coma are produced by the second lens unit and the third lens unit which have the positive refractive power in such a directions as to correct the above-mentioned astigmatism and coma, whereby these aberrations are almost zeroed in the objective lens system as a whole. Since the second lens unit is sufficiently far from the aperture stop in this case, the principal ray is high on this lens unit.

Therefore, the second lens unit is designed so as to have an image side surface which has a center of curvature located on the object side of this surface so that the aberrations produced by the first lens unit are cancelled with aberrations which are produced in the reverse direction by this surface.

Further, coma which is produced by the second lens unit and the third lens unit is corrected by designing the third lens unit so as to have an image side surface which has a center of curvature located on the object side of this surface.

Furthermore, when the aperture stop is arranged between the second lens unit and the third lens unit as in the case of the ninth through eleventh embodiments, i.e., at a location which is closer to the second lens unit than the location of the aperture stop selected for the seventh or eighth embodiment, the image side surface of the second lens unit has a weakened function to correct the astigmatism which is produced by the image side surface of the first lens unit. Since the third lens unit is located after the aperture stop and produces astigmatism which is curved in the same direction as the astigmatism which is produced by the first lens unit, it is difficult to correct the astigmatism in the objective lens system as a whole.

Accordingly, amount of the astigmatism to be produced by the image side surface of the first lens unit is reduced by arranging the first lens unit so that the principal ray passing therethrough is directed almost to the center of curvature of the image side surface of the first lens unit, and the weakening of the astigmatism correcting function of the second lens unit is reduced by designing the second lens unit and the third lens unit have so as to have an object side surface and an image side surface respectively which have centers of curvature located on the side of the aperture stop, whereby the astigmatism is corrected favorably in the objective lens system as a whole.

As for correction of the coma, curvature is selected for the object side surface of the second lens unit so that the principal ray is incident nearly perpendicularly onto this surface for reducing an amount of coma to be produced by the object side surface of the second lens unit, and a location of center of curvature on the image side surface of the second lens unit is adjusted properly for correcting the coma in the objective lens system as a whole. In order to design the third lens unit so as to have a shape which can hardly produce the coma and astigmatism in this case, center of curvature especially on the image side surface of the third lens unit is located on the object side thereof. This design makes it possible to obtain symmetry of the coma in the objective lens system as a whole. In addition, curvature of field slightly remains in the objective lens system as a whole.

For the reasons described above, the objective lens system for endoscopes according to the present invention comprises, in order from the object side, the first lens unit having negative refractive power, the second lens unit having positive refractive power and the third lens unit having positive refractive power, and is characterized in that it satisfies the above-mentioned conditions (5) and (6). This objective lens system can accomplish the second object of the present invention.

It can be considered that the objective lens system for endoscopes according to the present invention which has the composition described above is composed of an afocal front subsystem consisting of the first lens unit and the second lens unit, and a rear subsystem consisting of the third lens unit which is composed of a single lens component having positive refractive power. Therefore, the objective lens system has a total length L which is expressed by the following formula:

$$L = |f_2| - |f_1| + d + |f_3|$$

wherein the reference symbol $f_3$ represents a focal length of the third lens unit.

On an assumption of $|f_1/f_2| = \alpha$, a focal length f of the objective lens system as a whole is expressed as $f = \alpha f_3$ and the formula expressing the total length L of the objective lens system as a whole is transformed as follows:

$$L = |f_2| - |\alpha \cdot f_2| + d + f/|\alpha|$$

As is understood from this formula, too small a value of $\alpha$ makes it impossible to remarkably shorten the total length of the objective lens system as a whole. In contrast, too large a value of $\alpha$ shortens the focal length of the third lens unit, thereby requiring too strong an aberration correcting function for the third lens unit and making it difficult to correct aberrations in the objective lens system as a whole.

For this reason, it is desirable that the objective lens system for endoscopes according to the present invention satisfies the condition defined below:

$$0.07 < \alpha < 2.5$$

In a case where the aperture stop has a small diameter (or the objective lens system has a large F number) and picture elements are arranged at large pitches on image sensors such as CCD which are to be used in combination with the objective lens system for endoscopes according to the present invention, the upper limit of the above-mentioned condition may be extended to 5 or so.

Further, in another case where it is necessary to arrange a filter or the similar member in the objective lens system for endoscopes according to the present invention, the lower limit of the above-mentioned condition may be lowered to 0.03 or so. When $\alpha$ has a value which is close to such a lowered limit, the objective lens system will not be so compact but pose no problem in practical use.

The condition (6) defines the distance d as measured between the second lens unit and the third lens unit. If d has a value exceeding the upper limit of the condition (6), the objective lens system will have a total length which is undesirably long.

In the objective lens system for endoscopes according to the present invention which has the composition satisfying the conditions (5) and (6), aberrations can be corrected more favorably by arranging at least one aspherical surface at an adequate location in the lens system. It is desirable to use the aspherical surface for correcting spherical aberration and coma which are aggravated especially when the objective lens system has a small F number or a relatively large numerical aperture. This aspherical surface should desirably satisfy the following condition (7):

$$|h_c/h_m| < 2$$

wherein the reference symbol $h_c$ represents a height of an offaxial principal ray which is to attain to the maximum image height and the reference symbol $h_m$ designates a height of an axial marginal ray.

The condition (7) defines a ratio between the height of the offaxial principal ray as measured on the aspherical surface relative to that of the axial marginal ray as measured on the aspherical surface and is required for correcting mainly spherical aberration and coma by the aspherical surface.

For correcting the spherical aberration and coma in this case, the aspherical surface must have a convex shape which has curvature progressively lowered as portions of the aspherical surface are farther from the optical axis or a concave shape which has curvature progressively enhanced as portions of the aspherical surface are farther from the optical axis. That is to say, the aspherical surface having the shape described above scarecely produces the spherical aberration and coma which would be produced remarkably on the negative side by a spherical surface.

DETAILED DESCRIPTION OF THE PREFERRED EMBODIMENTS

Figure 1:
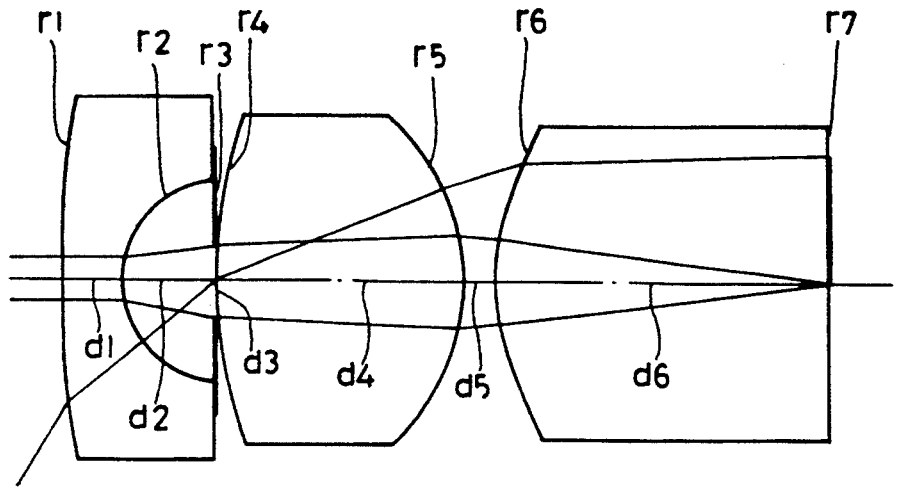
FIG. 1 through FIG. 18 show sectional views illstrating compositions of first through eighteenth embodiments respectively of the objective lens system for endoscopes according to the present invention.

Now, the objective lens system for endoscopes according to the present invention will be described more detailedly below with reference to the embodiments illustrated in the accompanying drawings and given in the form of the following numerical data:

---

Embodiment 1

$f = 1.000$, F/2.649, IH = 1.0535,
object distance = $-13.8169$,
distance from final surface of objective lens system to image surface = 0.016
$r_1 = 86.3558$ (aspherical surface)
  $d_1 = 0.5181$   $n_1 = 1.51633$   $\nu_1 = 64.15$
$r_2 = 0.8152$
  $d_2 = 0.7761$
$r_3 = \infty$ (stop)
  $d_3 = 0.0010$
$r_4 = 3.9092$
  $d_4 = 2.0862$   $n_2 = 1.72916$   $\nu_2 = 54.68$
$r_5 = -1.7392$
  $d_5 = 0.2591$
$r_6 = 1.6792$ (aspherical surface)
  $d_6 = 2.7813$   $n_3 = 1.51633$   $\nu_3 = 64.15$
$r_7 = \infty$
aspherical surface coefficient
(1st surface)
$P = 1.0000$, $E = 0.39580 \times 10^{-1}$,
$F = -0.29530 \times 10^{-2}$, $G = -0.19633 \times 10^{-2}$
(6th surface)
$P = 1.0000$, $E = -0.60922 \times 10^{-1}$,
$F = -0.91382 \times 10^{-2}$, $G = 0.47341 \times 10^{-2}$,
$H = 0.42571 \times 10^{-2}$, $I = -0.49067 \times 10^{-2}$
$f_2 = 1.955$, $f_{12} = 2.223$, $|A_{2SP}/A_{3AS}| = 0.55072$,
$|A_{1AS}/A_{3AS}| = 0.15580$, $|(A_{2SP} + A_{1AS})/A_{3AS}| = 0.70652$ Embodiment 2

$f = 1.000$, F/2.646, IH = 1.0517,
object distance = $-13.7931$,
distance from final surface of objective lens system to image surface = 0.001
$r_1 = 86.2069$ (aspherical surface)
  $d_1 = 0.5172$   $n_1 = 1.51633$   $\nu_1 = 64.15$
$r_2 = 0.8655$
  $d_2 = 0.8655$
$r_3 = \infty$ (stop)
  $d_3 = 0.0050$
$r_4 = 4.2005$
  $d_4 = 2.0518$   $n_2 = 1.72916$   $\nu_2 = 54.68$
$r_5 = -1.7829$
  $d_5 = 0.2586$
$r_6 = 1.6724$ (aspherical surface)
  $d_6 = 2.7953$   $n_3 = 1.51633$   $\nu_3 = 64.15$
$r_7 = \infty$
aspherical surface coefficient
(1st surface)
$P = 1.0000$, $E = 0.39785 \times 10^{-1}$,
$F = -0.29785 \times 10^{-2}$, $G = -0.19872 \times 10^{-2}$
(6th surface)
$P = 1.0000$, $E = -0.56047 \times 10^{-1}$,
$F = -0.57663 \times 10^{-2}$, $G = -0.88319 \times 10^{-3}$
$f_2 = 2.007$, $f_{12} = 2.224$, $|A_{2SP}/A_{3AS}| = 0.5806$,
$|A_{1AS}/A_{3AS}| = 0.2092$, $|(A_{2SP}+ A_{1AS})/A_{3AS}| = 0.7815$ Embodiment 3

$f = 1.000$, F/2.424, IH = 1.0535,
object distance = $-17.2712$,
distance from final surface of objective lens system to image surface = 0.016
$r_1 = 86.3558$ (aspherical surface)
  $d_1 = 0.5181$   $n_1 = 1.51633$   $\nu_1 = 64.15$
$r_2 = 0.8152$
  $d_2 = 0.8619$
$r_3 = \infty$ (stop)
  $d_3 = 0.0010$
$r_4 = 3.9655$
  $d_4 = 1.9313$   $n_2 = 1.72916$   $\nu_2 = 54.68$
$r_5 = -1.7392$
  $d_5 = 0.4318$
$r_6 = 1.6538$ (aspherical surface)
  $d_6 = 2.6598$   $n_3 = 1.51633$   $\nu_3 = 64.15$
$r_7 = \infty$
aspherical surface coefficient
(1st surface)
$P = 1.0000$, $E = 0.39580 \times 10^{-1}$,
$F = -0.29530 \times 10^{-2}$, $G = -0.19633 \times 10^{-2}$
(6th surface)
$P = 1.0000$, $E = -0.26822 \times 10^{-1}$,
$F = -0.57910 \times 10^{-1}$, $G = 0.12977 \times 10^{-1}$,
$H = 0.28091 \times 10^{-1}$, $I = -0.16645 \times 10^{-1}$
$f_2 = 1.934$, $f_{12} = 2.163$, $|A_{2SP}/A_{3AS}| = 1.3296$,
$|A_{1AS}/A_{3AS}| = 0.4527$, $|(A_{2SP}+ A_{1AS})/A_{3AS}| = 0.7824$ Embodiment 4

$f = 1.000$, F/2.726, IH = 0.9472,
object distance = $-15.5280$,
distance from final surface of objective lens system to image surface = 0.225
$r_1 = 77.6398$ (aspherical surface)
  $d_1 = 0.4659$   $n_1 = 1.51633$   $\nu_1 = 64.15$
$r_2 = 0.7329$
  $d_2 = 0.7749$
$r_3 = \infty$ (stop)
  $d_3 = 0.0009$
$r_4 = 3.5652$
  $d_4 = 1.7364$   $n_2 = 1.72916$   $\nu_2 = 54.68$
$r_5 = -1.5637$
  $d_5 = 0.3882$
$r_6 = 1.4869$ (aspherical surface)
  $d_6 = 1.5528$   $n_3 = 1.51633$   $\nu_3 = 64.15$
$r_7 = -1.7081$
  $d_7 = 0.7764$   $n_4 = 1.84666$   $\nu_4 = 23.78$
$r_8 = \infty$
aspherical surface coefficient
(1st surface)
$P = 1.0000$, $E = 0.54462 \times 10^{-1}$,
$F = -0.50268 \times 10^{-2}$, $G = -0.41347 \times 10^{-2}$
(6th surface)
$P = 1.0000$, $E = -0.36908 \times 10^{-1}$,
$F = -0.98580 \times 10^{-1}$, $G = 0.27330 \times 10^{-1}$,
$H = 0.73187 \times 10^{-1}$, $I = -0.53649 \times 10^{-1}$
$f_2 = 1.739$, $f_{12} = 1.944$, $|A_{2SP}/A_{3AS}| = 1.328$,
$|A_{1AS}/A_{3AS}| = 0.4525$, $|(A_{2SP} + A_{1AS})/A_{3AS}| = 1.781$ Embodiment 5

$f = 1.000$, F/2.483, IH = 1.0167,
object distance = $-16.6667$,
distance from final surface of objective lens system to image surface = 0.000

-continued

| | | | |
|---|---|---|---|
| $r_1 = 8.3333$ | | | |
| | $d_1 = 0.5000$ | $n_1 = 1.51633$ | $\nu_1 = 64.15$ |
| $r_2 = 1.0267$ | | | |
| | $d_2 = 1.1018$ | | |
| $r_3 = \infty$ (stop) | | | |
| | $d_3 = 0.0000$ | | |
| $r_4 = 2.6261$ | | | |
| | $d_4 = 1.8908$ | $n_2 = 1.72916$ | $\nu_2 = 54.68$ |
| $r_5 = -1.8039$ | | | |
| | $d_5 = 0.2770$ | | |
| $r_6 = 1.6010$ (aspherical surface) | | | |
| | $d_6 = 2.0845$ | $n_3 = 1.51633$ | $\nu_3 = 64.15$ |
| $r_7 = \infty$ | | | | aspherical surface coefficient
$P = 1.0000, E = -0.39548 \times 10^{-1}$,
$F = -0.51667 \times 10^{-1}, G = 0.26459 \times 10^{-1}$,
$H = 0.39518 \times 10^{-1}, I = -0.34342 \times 10^{-1}$
$f_2 = 1.788, f_{12} = 1.746, |A_{2SP}/A_{3AS}| = 1.3607$,
$|A_{1AS}/A_{3AS}| = 0, |(A_{2SP} + A_{1AS})/A_{3AS}| = 1.3607$

Embodiment 6
$F = 1.000, F/2.417, IH = 1.0535$,
object distance $= -17.2712$,
distance from final surface of objective lens system
to image surface $= 0.018$

| | | | |
|---|---|---|---|
| $r_1 = 17.2712$ | | | |
| | $d_1 = 0.5181$ | $n_1 = 1.51633$ | $\nu_1 = 64.15$ |
| $r_2 = 0.8047$ (aspherical surface) | | | |
| | $d_2 = 0.9121$ | | |
| $r_3 = \infty$ (stop) | | | |
| | $d_3 = 0.0010$ | | |
| $r_4 = 4.4820$ | | | |
| | $d_4 = 1.9981$ | $n_2 = 1.72916$ | $\nu_2 = 54.68$ |
| $r_5 = -1.7701$ | | | |
| | $d_5 = 0.4425$ | | |
| $r_6 = 1.6446$ (aspherical surface) | | | |
| | $d_6 = 2.7040$ | $n_3 = 1.51633$ | $\nu_3 = 64.15$ |
| $r_7 = \infty$ | | | | aspherical surface coefficient
(2nd surface)
$P = 1.0000, E = -0.11598, F = -0.40346$,
$G = -0.38855$
(6th surface)
$P = 1.0000, E = -0.31119 \times 10^{-1}$,
$F = -0.58652 \times 10^{-1}, G = 0.12859 \times 10^{-1}$,
$H = 0.27636 \times 10^{-1}, I = -0.16595 \times 10^{-1}$
$f_2 = 2.011, f_{12} = 2.223, |A_{2SP}/A_{3AS}| = 1.003$,
$|A_{1AS}/A_{3AS}| = 0.4540, |(A_{2SP} + A_{1AS})/A_{3AS}| = 1.457$

Embodiment 7
$f = 1.000, F/4.290, 2\omega = 116°$

| | | | |
|---|---|---|---|
| $r_1 = \infty$ | | | |
| | $d_1 = 0.5500$ | $n_1 = 1.88300$ | $\nu_1 = 40.78$ |
| $r_2 = 0.9454$ | | | |
| | $d_2 = 1.2300$ | | |
| $r_3 = 4.0175$ | | | |
| | $d_3 = 0.8600$ | $n_2 = 1.88300$ | $\nu_2 = 40.78$ |
| $r_4 = -2.6882$ | | | |
| | $d_4 = 0.4000$ | | |
| $r_5 = 33.6773$ | | | |
| | $d_5 = 1.0300$ | $n_3 = 1.72916$ | $\nu_3 = 54.68$ |
| $r_6 = -2.3068$ | | | |
| | $d_6 = 0.0200$ | | |
| $r_7 = \infty$ (stop) | | | |
| | $d_7 = 0.5600$ | $n_4 = 1.52000$ | $\nu_4 = 74.00$ |
| $r_8 = \infty$ | | | |
| | $d_8 = 0.0300$ | | |
| $r_9 = \infty$ | | | |
| | $d_9 = 0.3600$ | $n_5 = 1.52287$ | $\nu_5 = 59.89$ |
| $r_{10} = \infty$ | | | |
| | $d_{10} = 0.8000$ | | |
| $r_{11} = \infty$ | | | |
| | $d_{11} = 0.9400$ | $n_6 = 1.51633$ | $\nu_6 = 64.15$ |
| $r_{12} = \infty$ | | | |

$|f_1/f_2| = 0.55, d/f = 1.16$

Embodiment 8
$f = 0.965, F/3.993, 2\omega = 135°$

| | | | |
|---|---|---|---|
| $r_1 = \infty$ | | | |
| | $d_1 = 0.3738$ | $n_1 = 1.88300$ | $\nu_1 = 40.78$ |
| $r_2 = 1.0287$ | | | |
| | $d_2 = 1.0469$ | | |
| $r_3 = 4.6383$ | | | |
| | $d_3 = 1.0510$ | $n_2 = 1.88300$ | $\nu_2 = 40.78$ |
| $r_4 = -6.1647$ | | | |
| | $d_4 = 0.6367$ | | |
| $r_5 = 3.2550$ | | | |
| | $d_5 = 0.5606$ | $n_3 = 1.72916$ | $\nu_3 = 54.68$ |
| $r_6 = -2.2529$ | | | |
| | $d_6 = 0.0184$ | | |
| $r_7 = \infty$ (stop) | | | |
| | $d_7 = 0.6181$ | $n_4 = 1.52000$ | $\nu_4 = 74.00$ |
| $r_8 = \infty$ | | | |
| | $d_8 = 0.0280$ | | |
| $r_9 = \infty$ | | | |
| | $d_9 = 0.3988$ | $n_5 = 1.52287$ | $\nu_5 = 59.89$ |
| $r_{10} = \infty$ | | | |
| | $d_{10} = 0.7774$ | | |
| $r_{11} = \infty$ | | | |
| | $d_{11} = 0.9970$ | $n_6 = 1.51633$ | $\nu_6 = 64.15$ |
| $r_{12} = \infty$ | | | |

$|f_1/f_2| = 0.371, d/f = 1.19$

Embodiment 9
$f = 1.000, F/4.300, 2\omega = 100°$

| | | | |
|---|---|---|---|
| $r_1 = \infty$ | | | |
| | $d_1 = 0.3284$ | $n_1 = 1.88300$ | $\nu_1 = 40.78$ |
| $r_2 = 1.0635$ | | | |
| | $d_2 = 0.8128$ | | |
| $r_3 = 1.7391$ | | | |
| | $d_3 = 0.8210$ | $n_2 = 1.88300$ | $\nu_2 = 40.78$ |
| $r_4 = -7.8275$ | | | |
| | $d_4 = 0.4105$ | | |
| $r_5 = \infty$ (stop) | | | |
| | $d_5 = 0.0246$ | | |
| $r_6 = 6.2260$ | | | |
| | $d_6 = 0.5114$ | $n_3 = 1.72916$ | $\nu_3 = 54.68$ |
| $r_7 = -1.7509$ | | | |
| | $d_7 = 0.0162$ | | |
| $r_8 = \infty$ | | | |
| | $d_8 = 0.5090$ | $n_4 = 1.52000$ | $\nu_4 = 74.00$ |
| $r_9 = \infty$ | | | |
| | $d_9 = 0.0246$ | | |
| $r_{10} = \infty$ | | | |
| | $d_{10} = 0.3284$ | $n_5 = 1.52287$ | $\nu_5 = 59.89$ |
| $r_{11} = \infty$ | | | |
| | $d_{11} = 0.3801$ | | |
| $r_{12} = \infty$ | | | |
| | $d_{12} = 0.8210$ | $n_6 = 1.51633$ | $\nu_6 = 64.15$ |
| $r_{13} = \infty$ | | | |

$|f_1/f_2| = 0.717, d/f = 1.04$

Embodiment 10
$f = 1.001, F/3.833, 2\omega = 100°$

| | | | |
|---|---|---|---|
| $r_1 = \infty$ | | | |
| | $d_1 = 0.4984$ | $n_1 = 1.88300$ | $\nu_1 = 40.78$ |
| $r_2 = 1.2048$ | | | |
| | $d_2 = 0.5708$ | | |
| $r_3 = \infty$ | | | |
| | $d_3 = 0.6431$ | $n_2 = 1.51633$ | $\nu_2 = 64.15$ |
| $r_4 = \infty$ | | | |
| | $d_4 = 0.0322$ | | |
| $r_5 = 1.3000$ | | | |
| | $d_5 = 0.7464$ | $n_3 = 1.51728$ | $\nu_3 = 69.56$ |
| $r_6 = -3.0866$ | | | |
| | $d_6 = 0.2912$ | | |
| $r_7 = \infty$ (stop) | | | |
| | $d_7 = 0.9419$ | $n_4 = 1.51728$ | $\nu_4 = 69.56$ |
| $r_8 = -1.0736$ | | | |
| | $d_8 = 0.5266$ | | |
| $r_9 = \infty$ | | | |
| | $d_9 = 1.6077$ | $n_5 = 1.51633$ | $\nu_5 = 64.15$ |
| $r_{10} = \infty$ | | | |

$|f_1/f_2| = 0.727, d/f = 1.28$

Embodiment 11
$f = 1.000, F/4.243, 2\omega = 100°$

| | | | |
|---|---|---|---|
| $r_1 = \infty$ | | | |
| | $d_1 = 0.3320$ | $n_1 = 1.88300$ | $\nu_1 = 40.78$ |
| $r_2 = 1.0944$ | | | |
| | $d_2 = 0.8216$ | | |
| $r_3 = 1.4850$ | | | |
| | $d_3 = 0.8299$ | $n_2 = 1.83400$ | $\nu_2 = 37.16$ |
| $r_4 = -4.8373$ | | | |
| | $d_4 = 0.3734$ | | |
| $r_5 = \infty$ (stop) | | | |
| | $d_5 = 0.1826$ | | |
| $r_6 = 11.1197$ | | | |

-continued

| | | | |
|---|---|---|---|
| | $d_6 = 0.5228$ | $n_3 = 1.81600$ | $\nu_3 = 46.62$ |
| $r_7 = -2.0380$ | | | |
| | $d_7 = 0.0166$ | | |
| $r_8 = \infty$ | | | |
| | $d_8 = 0.5145$ | $n_4 = 1.52000$ | $\nu_4 = 74.00$ |
| $r_9 = \infty$ | | | |
| | $d_9 = 0.0249$ | | |
| $r_{10} = \infty$ | | | |
| | $d_{10} = 0.3320$ | $n_5 = 1.52287$ | $\nu_5 = 59.89$ |
| $r_{11} = \infty$ | | | |
| | $d_{11} = 0.1411$ | | |
| $r_{12} = \infty$ | | | |
| | $d_{12} = 0.8299$ | $n_6 = 1.51633$ | $\nu_6 = 64.15$ |
| $r_{13} = \infty$ | | | |

$|f_1/f_2| = 0.855$, $d/f = 1.17$

Embodiment 12

$f = 1.001$, $F/2.796$, $2\omega = 100°$

| | | | |
|---|---|---|---|
| $r_1 = \infty$ | | | |
| | $d_1 = 0.5000$ | $n_1 = 1.88300$ | $\nu_1 = 40.78$ |
| $r_2 = 0.9742$ | | | |
| | $d_2 = 1.1200$ | | |
| $r_3 = 1.3171$ | | | |
| | $d_3 = 0.7000$ | $n_2 = 1.88300$ | $\nu_2 = 40.78$ |
| $r_4 = 3.3918$ | | | |
| | $d_4 = 0.2400$ | | |
| $r_5 = 5.4887$ (aspherical surface) | | | |
| | $d_5 = 0.4900$ | $n_3 = 1.75500$ | $\nu_3 = 52.33$ |
| $r_6 = -1.7388$ | | | |
| | $d_6 = 0.0200$ | | |
| $r_7 = \infty$ (stop) | | | |
| | $d_7 = 0.5000$ | $n_4 = 1.52000$ | $\nu_4 = 74.00$ |
| $r_8 = \infty$ | | | |
| | $d_8 = 0.0200$ | | |
| $r_9 = \infty$ | | | |
| | $d_9 = 0.3300$ | $n_5 = 1.52287$ | $\nu_5 = 59.89$ |
| $r_{10} = \infty$ | | | |
| | $d_{10} = 0.7500$ | | |
| $r_{11} = \infty$ | | | |
| | $d_{11} = 0.8200$ | $n_6 = 1.51633$ | $\nu_6 = 64.15$ |
| $r_{12} = \infty$ | | | | aspherical surface coefficient
$P = 1.0000$, $E = -0.22281$, $F = -0.12062 \times 10^{-1}$,
$G = -0.54320 \times 10^{-1}$
$|f_1/f_2| = 0.52$, $d/f = 0.036$, $|h_c/h_m| = 0.37$

Embodiment 13

$f = 1.000$, $F/2.536$, $2\omega = 100°$

| | | | |
|---|---|---|---|
| $r_1 = \infty$ | | | |
| | $d_1 = 0.3234$ | $n_1 = 1.88300$ | $\nu_1 = 40.78$ |
| $r_2 = 0.9210$ | | | |
| | $d_2 = 0.8003$ | | |
| $r_3 = 1.2745$ | | | |
| | $d_3 = 0.8084$ | $n_2 = 1.80518$ | $\nu_2 = 25.43$ |
| $r_4 = 7.4446$ | | | |
| | $d_4 = 0.4042$ | | |
| $r_5 = \infty$ (stop) | | | |
| | $d_5 = 0.0243$ | | |
| $r_6 = 1.2714$ | | | |
| | $d_6 = 0.5012$ | $n_3 = 1.77250$ | $\nu_3 = 49.66$ |
| $r_7 = 91.2505$ (aspherical surface) | | | |
| | $d_7 = 0.1617$ | | |
| $r_8 = \infty$ | | | |
| | $d_8 = 0.5012$ | $n_4 = 1.52000$ | $\nu_4 = 74.00$ |
| $r_9 = \infty$ | | | |
| | $d_9 = 0.0243$ | | |
| $r_{10} = \infty$ | | | |
| | $d_{10} = 0.3234$ | $n_5 = 1.52287$ | $\nu_5 = 59.89$ |
| $r_{11} = \infty$ | | | |
| | $d_{11} = 0.2183$ | | |
| $r_{12} = \infty$ | | | |
| | $d_{12} = 0.8084$ | $n_6 = 1.51633$ | $\nu_6 = 64.15$ |
| $r_{13} = \infty$ | | | | aspherical surface coefficient
$P = 1.0000$, $E = 0.28326$
$|f_1/f_2| = 0.58$, $d/f = 1.05$, $|h_c/h_m| = 0.48$

Embodiment 14

$f = 1.000$, $F/2.808$, $2\omega = 100°$

| | | | |
|---|---|---|---|
| $r_1 = \infty$ | | | |
| | $d_1 = 0.3167$ | $n_1 = 1.88300$ | $\nu_1 = 40.78$ |
| $r_2 = 0.9520$ | | | |
| | $d_2 = 0.7852$ | | |
| $r_3 = 1.3451$ | | | |
| | $d_3 = 0.8320$ | $n_2 = 1.88300$ | $\nu_2 = 40.78$ |
| $r_4 = 8.2060$ (aspherical surface) | | | |
| | $d_4 = 0.4819$ | | |
| $r_5 = \infty$ (stop) | | | |
| | $d_5 = 0.0238$ | | |
| $r_6 = 1.8507$ (aspherical surface) | | | |
| | $d_6 = 0.4933$ | $n_3 = 1.72916$ | $\nu_3 = 54.68$ |
| $r_7 = -3.1601$ | | | |
| | $d_7 = 0.0156$ | | |
| $r_8 = \infty$ | | | |
| | $d_8 = 0.4909$ | $n_4 = 1.52000$ | $\nu_4 = 74.00$ |
| $r_9 = \infty$ | | | |
| | $d_9 = 0.0238$ | | |
| $r_{10} = \infty$ | | | |
| | $d_{10} = 0.3167$ | $n_5 = 1.52287$ | $\nu_5 = 59.89$ |
| $r_{11} = \infty$ | | | |
| | $d_{11} = 0.8234$ | | |
| $r_{12} = \infty$ | | | |
| | $d_{12} = 0.7918$ | $n_6 = 1.51633$ | $\nu_6 = 64.15$ |
| $r_{13} = \infty$ | | | | aspherical surface coefficient
(4th surface) $P = 1.0000$, $E = 0.53786 \times 10^{-2}$
(6th surface) $P = 1.0000$, $E = -0.12945$
$|f_1/f_2| = 0.626$, $d/f = 1.12$, $|h_c/h_m| = 0.82, 0.04$

Embodiment 15

$f = 1.000$, $F/2.743$, $2\omega = 100°$

| | | | |
|---|---|---|---|
| $r_1 = \infty$ | | | |
| | $d_1 = 0.3276$ | $n_1 = 1.88300$ | $\nu_1 = 40.78$ |
| $r_2 = 0.8369$ | | | |
| | $d_2 = 0.8190$ | | |
| $r_3 = 1.1527$ | | | |
| | $d_3 = 0.8190$ | $n_2 = 1.80100$ | $\nu_2 = 34.97$ |
| $r_4 = -6.3773$ (aspherical surface) | | | |
| | $d_4 = 0.1556$ | | |
| $r_5 = \infty$ (stop) | | | |
| | $d_5 = 0.1802$ | | |
| $r_6 = 2.4229$ (aspherical surface) | | | |
| | $d_6 = 0.5160$ | $n_3 = 1.72916$ | $\nu_3 = 54.68$ |
| $r_7 = -16.6121$ | | | |
| | $d_7 = 0.0164$ | | |
| $r_8 = \infty$ | | | |
| | $d_8 = 0.5078$ | $n_4 = 1.52000$ | $\nu_4 = 74.00$ |
| $r_9 = \infty$ | | | |
| | $d_9 = 0.0246$ | | |
| $r_{10} = \infty$ | | | |
| | $d_{10} = 0.3276$ | $n_5 = 1.52287$ | $\nu_5 = 59.89$ |
| $r_{11} = \infty$ | | | |
| | $d_{11} = 0.2457$ | | |
| $r_{12} = \infty$ | | | |
| | $d_{12} = 0.8190$ | $n_6 = 1.51633$ | $\nu_6 = 64.15$ |
| $r_{13} = \infty$ | | | | aspherical surface coefficient
(4th surface) $P = 1.0000$, $E = 0.24824 \times 10^{-1}$
(6th surface) $P = 1.0000$, $E = -0.26080$
$|f_1/f_2| = 0.74$, $d/f = 0.775$, $|h_c/h_m| = 0.245, 0.31$

Embodiment 16

$f = 1.000$, $F/2.717$, $2\omega = 100°$

| | | | |
|---|---|---|---|
| $r_1 = \infty$ | | | |
| | $d_1 = 0.3317$ | $n_1 = 1.88300$ | $\nu_1 = 40.78$ |
| $r_2 = 0.9017$ | | | |
| | $d_2 = 0.7839$ | | |
| $r_3 = 2.1170$ | | | |
| | $d_3 = 0.8543$ | $n_2 = 1.92286$ | $\nu_2 = 21.29$ |
| $r_4 = -3.7880$ (aspherical surface) | | | |
| | $d_4 = 0.0402$ | | |
| $r_5 = \infty$ (stop) | | | |
| | $d_5 = 0.4824$ | | |
| $r = 3.0647$ | | | |
| | $d_6 = 0.5126$ | $n_3 = 1.81600$ | $\nu_3 = 46.62$ |
| $r_7 = -4.2574$ (aspherical surface) | | | |
| | $d_7 = 0.0201$ | | |
| $r = \infty$ | | | |
| | $d_8 = 0.5226$ | $n_4 = 1.52000$ | $\nu_4 = 74.00$ |
| $r_9 = \infty$ | | | |
| | $d_9 = 0.0201$ | | |
| $r_{10} = \infty$ | | | |
| | $d_{10} = 0.3317$ | $n_5 = 1.52287$ | $\nu_5 = 59.89$ |
| $r_{11} = \infty$ | | | |
| | $d_{11} = 0.4322$ | | |
| $r_{12} = \infty$ | | | |
| | $d_{12} = 0.8342$ | $n_6 = 1.51633$ | $\nu_6 = 64.15$ |
| $r_{13} = \infty$ | | | |

-continued aspherical surface coefficient
(4th surface) P = 1.0000, E = −0.39304 × 10⁻¹
(7th surface) P = 1.0000, E = 0.11972
$|f_1/f_2| = 0.65$, $d/f = 0.95$, $|h_c/h_m| = 0.05, 1.14$

Embodiment 17

$f = 1.000$, $F/2.791$, $2\omega = 100°$ $r_1 = \infty$
    $d_1 = 0.3876$    $n_1 = 1.88300$    $\nu_1 = 40.78$
$r_2 = 1.0210$
    $d_2 = 0.7969$
$r_3 = 2.5204$
    $d_3 = 0.8105$    $n_2 = 1.92286$    $\nu_2 = 21.29$
$r_4 = 18.3305$
    $d_4 = 0.0376$
$r_5 = \infty$ (stop)
    $d_5 = 0.4867$
$r_6 = 2.8587$ (aspherical surface)
    $d_6 = 0.5012$    $n_3 = 1.60300$    $\nu_3 = 65.48$
$r_7 = -1.2734$ (aspherical surface)
    $d_7 = 0.0159$
$r_8 = \infty$
    $d_8 = 0.4990$    $n_4 = 1.52000$    $\nu_4 = 74.00$
$r_9 = \infty$
    $d_9 = 0.0241$
$r_{10} = \infty$
    $d_{10} = 0.3219$    $n_5 = 1.52287$    $\nu_5 = 59.89$
$r_{11} = \infty$
    $d_{11} = 0.8370$
$r_{12} = \infty$
    $d_{12} = 0.8048$    $n_6 = 1.51633$    $\nu_6 = 64.15$
$r_{13} = \infty$ aspherical surface coefficient
(6th surface) P = 1.0000, E = −0.74331 × 10⁻¹
(7th surface) P = 1.0000, E = 0.67664 × 10⁻¹
$|f_1/f_2| = 0.37$, $d/f = 1.228$, $|h_c/h_m| = 0.65, 0.9$

Embodiment 18

$f = 1.000$, $F/2.881$, $2\omega = 100°$ $r_1 = \infty$
    $d_1 = 0.2865$    $n_1 = 1.88300$    $\nu_1 = 40.78$
$r_2 = 1.1064$ (aspherical surface)
    $d_2 = 0.7092$
$r_3 = 1.4467$ (aspherical surface)
    $d_3 = 0.7163$    $n_2 = 1.88300$    $\nu_2 = 40.78$
$r_4 = -1.9231$
    $d_4 = 0.3582$
$r_5 = \infty$ (stop)
    $d_5 = 0.0215$
$r_6 = 5.5434$
    $d_6 = 0.4441$    $n_3 = 1.72916$    $\nu_3 = 54.68$
$r_7 = -2.4913$
    $d_7 = 0.0143$
$r_8 = \infty$
    $d_8 = 0.4441$    $n_4 = 1.52000$    $\nu_4 = 74.00$
$r_9 = \infty$
    $d_9 = 0.0215$
$r_{10} = \infty$
    $d_{10} = 0.2865$    $n_5 = 1.52287$    $\nu_5 = 59.89$
$r_{11} = \infty$
    $d_{11} = 0.3510$
$r_{12} = \infty$
    $d_{12} = 0.7163$    $n_6 = 1.51633$    $\nu_6 = 64.15$
$r_{13} = \infty$ aspherical surface coefficient
(2nd surface)  P = 1.0000, B = −0.59647 × 10⁻¹,
    E = 0.20602, F = 0.41050,
    G = 0.16288
(3rd surface)  P = 1.0000, B = −0.19702,
    E = −0.13203 × 10⁻¹,
    F = 0.72757 × 10⁻¹, G = −0.14645
$|f_1/f_2| = 0.98$, $d/f = 0.71$, $|h_c/h_m| = 2.9, 1.2$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

Figure 2:
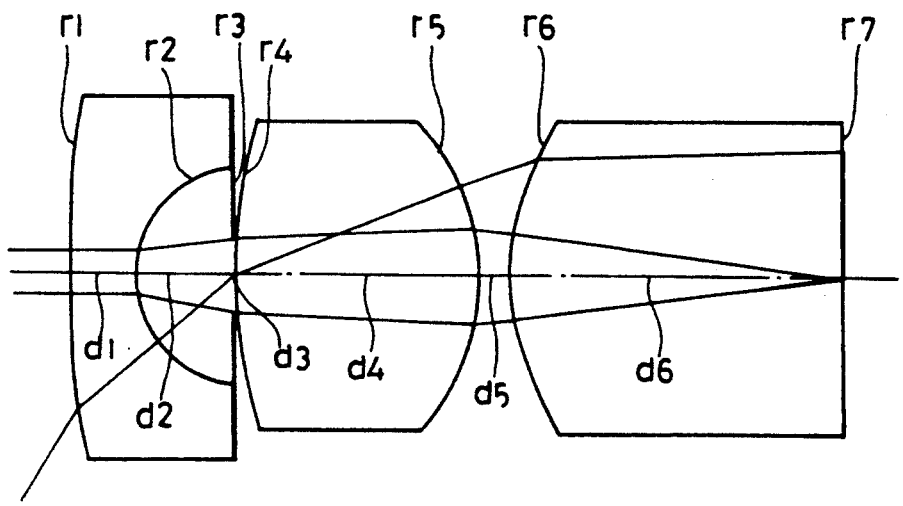
Figure 3:
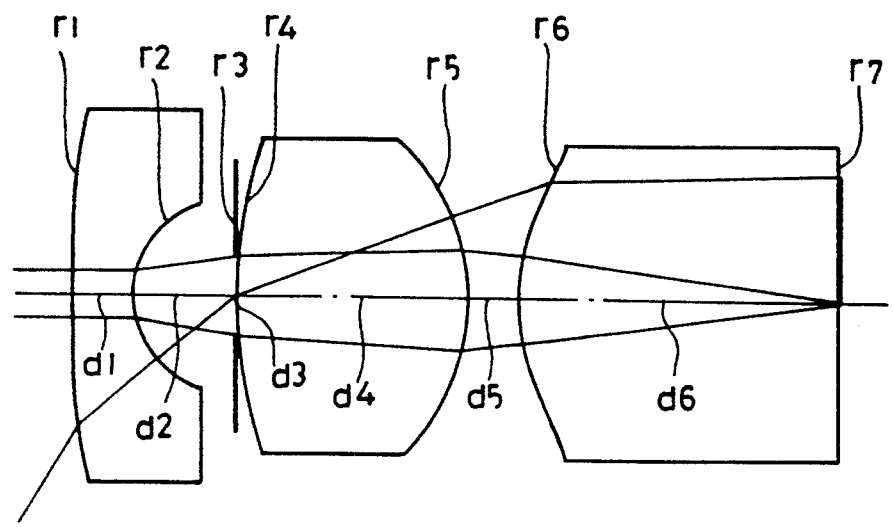

The first, second and third embodiments have the compositions illustrated in FIG. 1, FIG. 2 and FIG. 3 respectively, wherein each of the lens units is composed of a single lens component which satisfies the conditions (3) and (4). Further, aspherical surfaces are used in the first lens unit and the third lens unit for correcting distortion in these embodiments.

In each of these embodiments, the objective lens system is focused by varying the airspace reserved between the second lens unit and the third lens unit. Since it is impossible to perform the focusing when the marginal ray emerging from the second lens unit is in parallel with the optical axis, it is necessary that a total focal length $f_{12}$ of the first lens unit and the second lens unit satisfies the following condition:

$$|f_{12}| < 10f$$

wherein the reference symbol f represents a focal length of the objective lens system as a whole.

Since each of the first through third embodiments satisfies the conditions (3) and (4), a most object side surface of the second lens unit must have $S_i$ of a negative value. For this reason, the most object side surface of the second lens unit must have a radius of curvature $R_2$ which satisfies the following condition:

$$15f > R_2 > 0$$

If $R_2$ exceeds the upper limit of this condition, it will be difficult to correct the spherical aberration and the positive power of the second lens unit will be shifted rearward, thereby undesirably prolonging the total length of the objective lens system as a whole.

Further, a distance $S_K$ as measured from the final surface of the objective lens system to the image plane has a small value for allowing the final surface to be cemented to an image guide and other reasons. Further, the objective lens system preferred as each of the first through third embodiments should desirably satisfy the condition shown below:

$$0 \leq S_K \leq f$$

If $S_K$ is longer than f, the third lens unit will be complicated in structure thereof for assembling with a lens barrel.

So far as $S_K$ has a value within the range defined by the above-mentioned condition, the third lens unit can conveniently be integrated with an image pickup device.

Furthermore, in order to satisfy the above-mentioned condition, it is necessary that a final lens element arranged in the third lens unit (or a cemented lens component when the third lens unit consists of a single cemented lens component) must have thickness $D_3$ which satisfies the condition given below:

$$D_3 > 0.5f$$

Moreover, in order to correct the coma and shorten the total length of the objective lens system as a whole, it is preferable to design the second lens unit a viconvex lens component which has an image side convex surface having positive refractive power stronger than that of an object side convex surface, and a focal length f2 satisfying the following condition:

$$0 < f_2 < 7f$$

In addition, in order to prevent the total length of the objective lens system as a whole from being prolonged by the strong negative refractive power of the first lens unit, it is desirable that the third lens unit has a focal length $f_3$ which satisfies the condition shown below:

$$0 < f_3 < 12f$$

For correcting the astigmatism and coma, it is desirable that the third lens unit has such a shape as to impart positive power to an object side convex surface which is stronger than positive refractive power of an image side convex surface.

Figure 4:
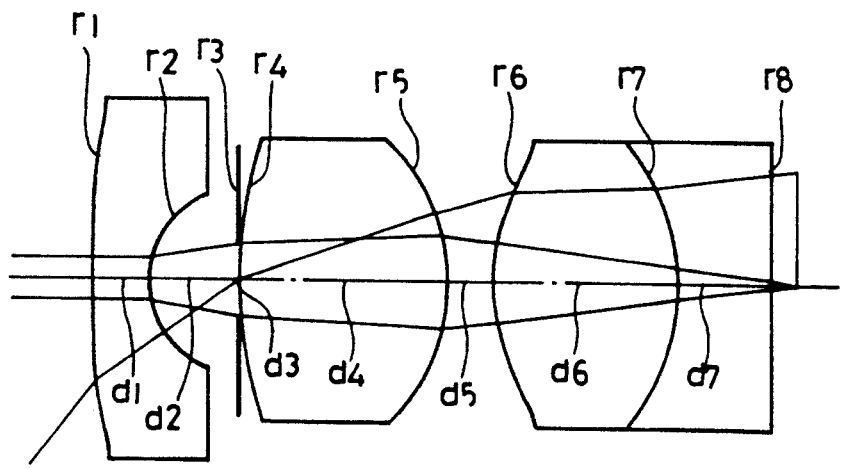

The fourth embodiment has the composition shown in FIG. 4, wherein the lens component arranged in the third lens unit is designed as a cemented lens component for correcting lateral chromatic aberration. The lateral chromatic aberration can be corrected by using a cemented lens component in the second lens unit.

Figure 5:
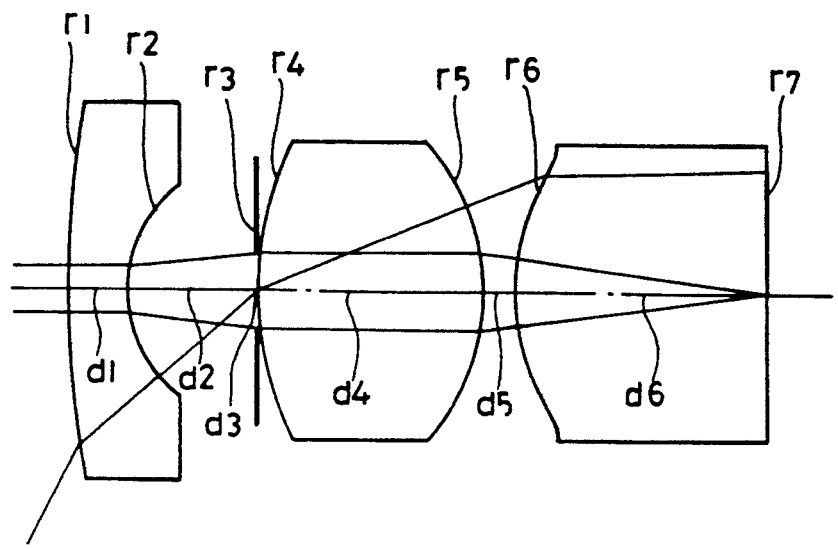

The fifth embodiment has the composition illustrated in FIG. 5, wherein the first lens unit comprises no aspherical surface and only the third lens unit uses an aspherical surface for lowering manufacturing cost of the objective lens system.

Figure 6:
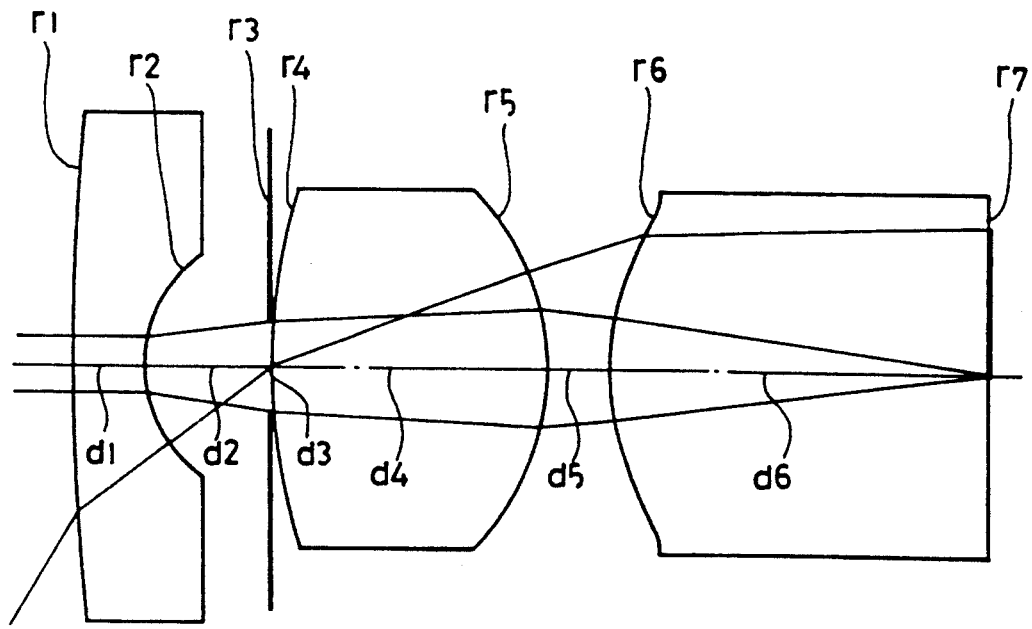

The sixth embodiment has the composition shown in FIG. 6, which is preferred as an example wherein the first lens unit has an image side surface designed as an aspherical surface including portions which have a diverging function progressively weakened as values of y increase. When aspherical lens elements are to be manufactured by pressing glass materials or plastic materials, designing a concave surface as an aspherical surface produces convenience since a convex die can be shaped more easily.

Each of the seventh through eighteenth embodiments is an example wherein each of the first lens unit through the third lens unit consists of a single lens component, and the objective lens system satisfies the conditions (5) and (6). All the surfaces are designed as spherical surfaces in the seventh to eleventh embodiments out of the seventh through eighteenth embodiments, whereas at least one aspherical surface is arranged at an adequate location in each of the twelfth through eighteenth embodiments for obtaining an objective lens system which has a small F number or a relatively large numerical aperture.

Figure 7:
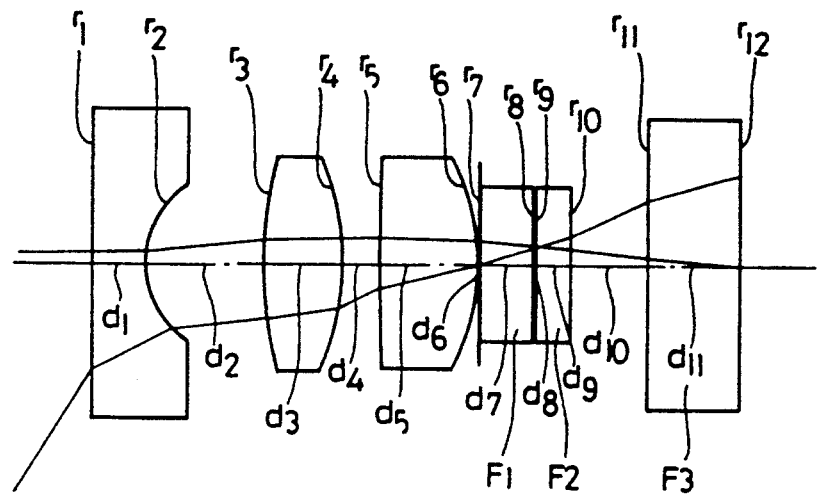
Figure 8:
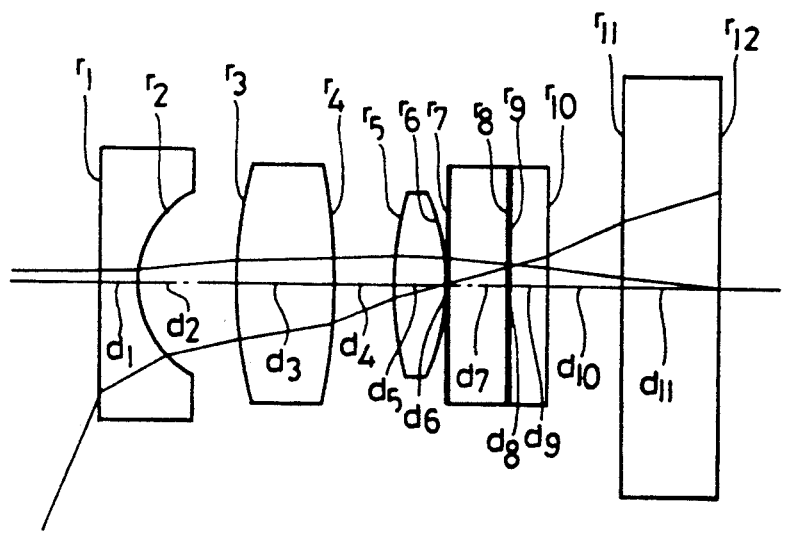

The seventh and eighth embodiments have the compositions shown in FIG. 7 and FIG. 8 respectively, in each of which an aperture stop is arranged on the image side of the third lens unit.

In an objective lens system of the type of the seventh or eighth embodiment, the first lens unit produces aberrations in directions which are reserve to those of the aberrations produced by the second and third lens units, and lateral chromatic aberration and the other aberrations are corrected favorably while reserving a board visual field for the objective lens system.

In FIG. 7 and FIG. 8 illustrating the seventh and eighth embodiments, the reference symbol $F_1$ represents an infrared cut filter for absorbing infrared light unwanted for observation, the reference symbol $F_2$ designates a YAG filter for shielding laser light unnecessary for observation and the reference symbol $F_3$ denotes a cover glass plate for a solid-state image sensor.

Figure 9:
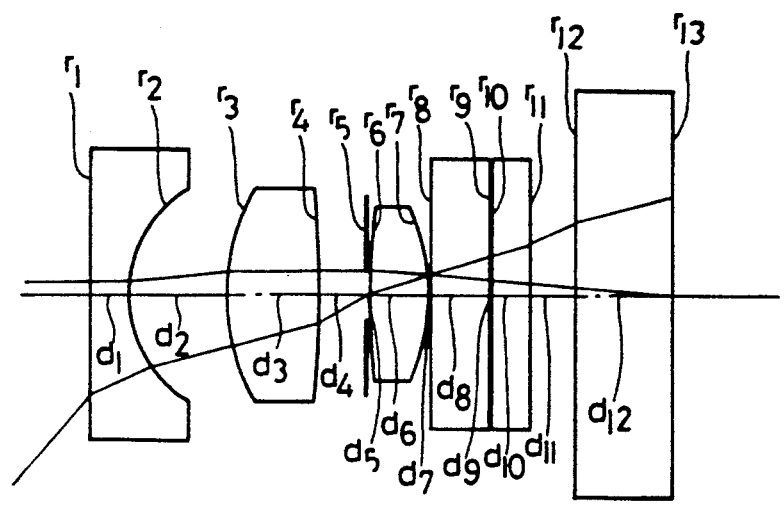
Figure 10:
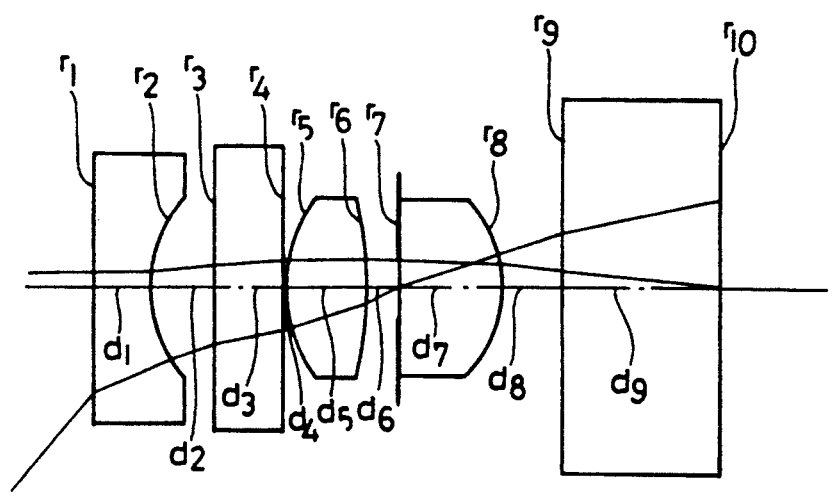
Figure 11:
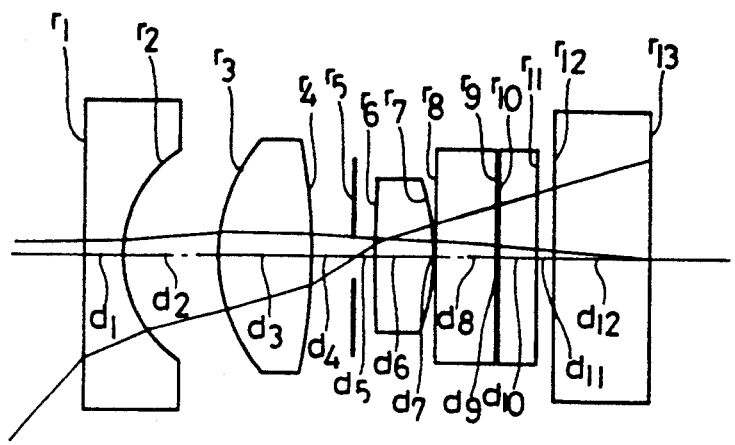

The ninth, tenth and eleventh embodiments have the compositions illustrated in FIG. 9, FIG. 10 and FIG. 11 respectively, in each of which an aperture stop is arranged between the second lens unit and the third lens unit.

An objective lens system of the type of the ninth through eleventh embodiments comprises an aperture stop arranged at a location which is closer to an object to be observed than the location of the aperture stop used in the objective lens system of the type of the seventh and eighth embodiments. Therefore, the composition selected for the seventh and eighth embodiment allows to lower the height of the principal ray incident on the first lens unit and is convenient for reducing a diameter of the objective lens system for endoscopes.

Figure 12:
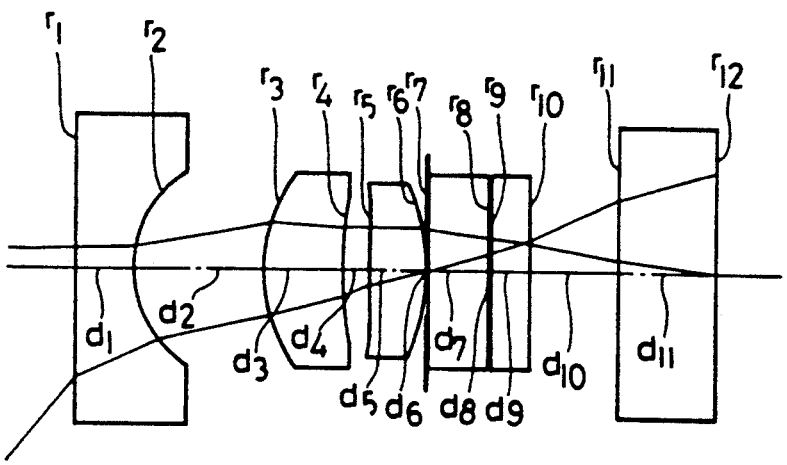

The twelfth embodiment has the composition shown in FIG. 12, wherein an aperture stop is arranged on the image side of the third lens unit and an object side surface of the third lens unit is designed as an aspherical surface. This aspherical surface has a convex shape which has curvature progressively lowered as portions of the aspherical surface are farther from the optical axis and a function of a concave surface at marginal portions thereof. That is to say, this aspherical surface has a function of a convex surface in the vicinity of the optical axis but a function of a concave surface at the marginal portions thereof. Accordingly, this aspherical surface exhibits an effect to suppress production of aberrations for a light bundle having an intermediate NA and the function of a concave surface for the marginal ray, or produces aberrations in directions reverse to each other by the central portions and the marginal portions thereof.

Figure 13:
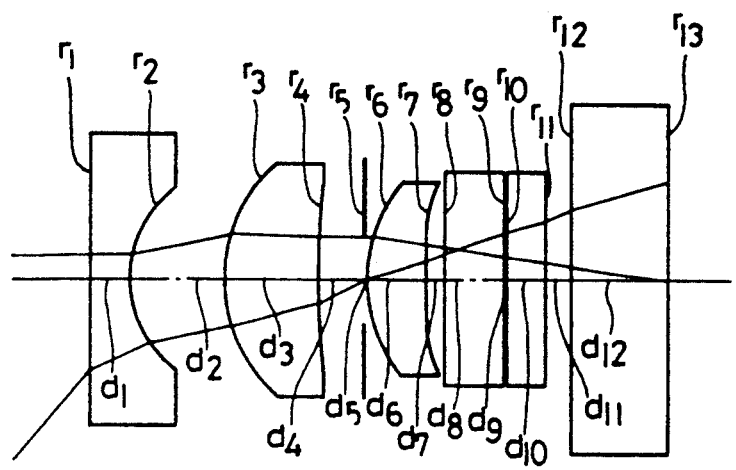
Figure 14:
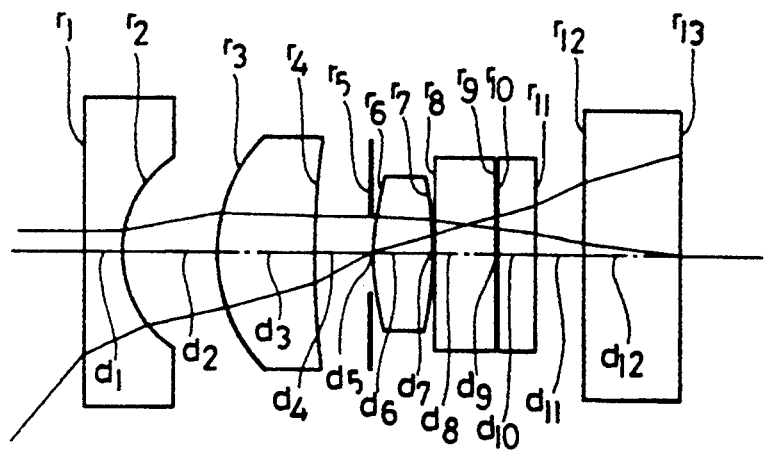
Figure 18:
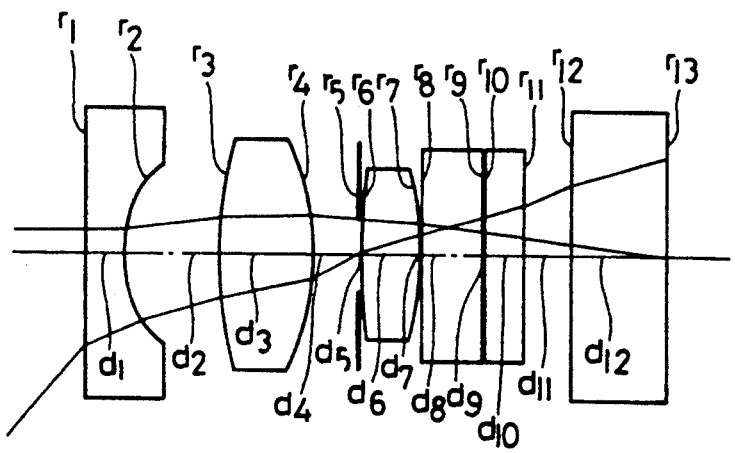
Figure 19:
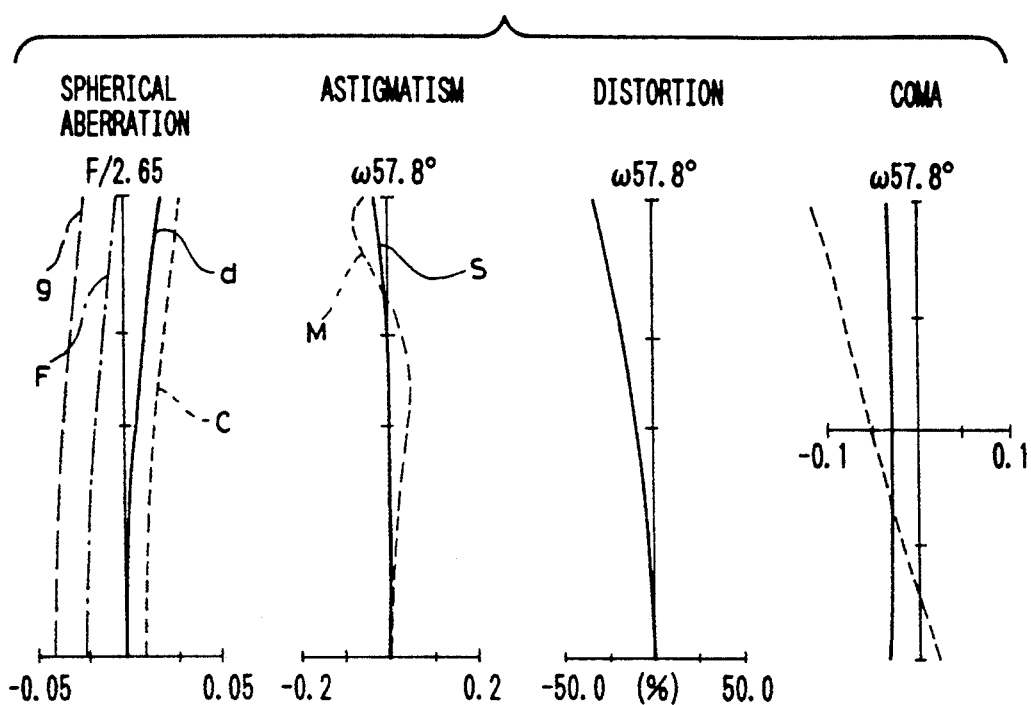
FIG. 19 through FIG. 36 show graphs illustrating aberration characteristics of the first through eighteenth embodiments respectively of the present invention.
Figure 20:
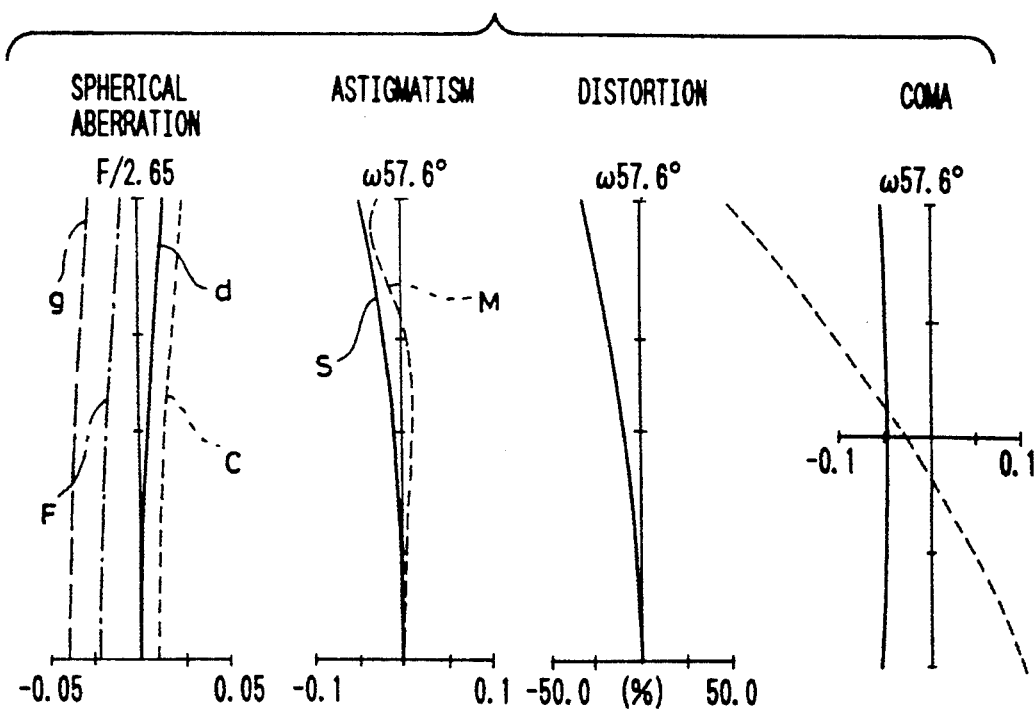
Figure 21:
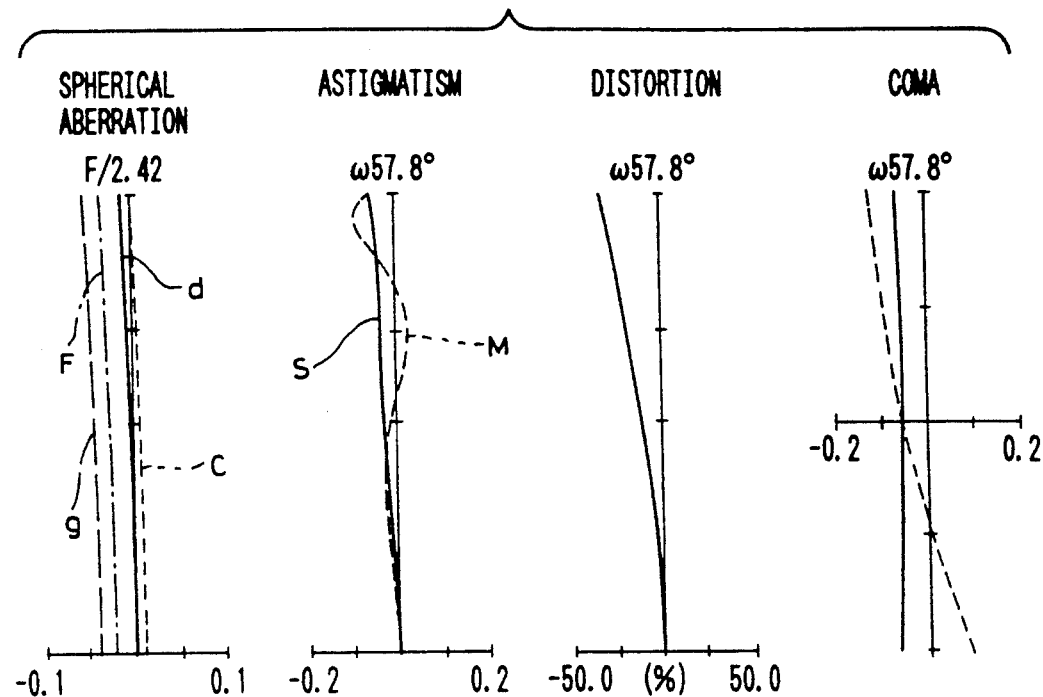
Figure 22:
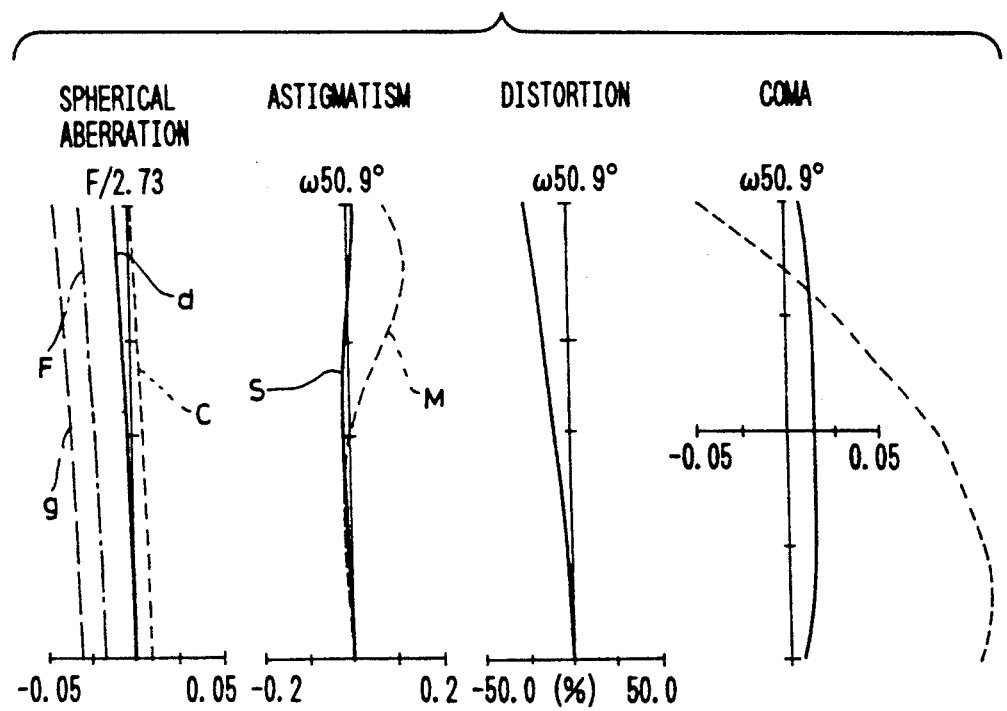
Figure 23:
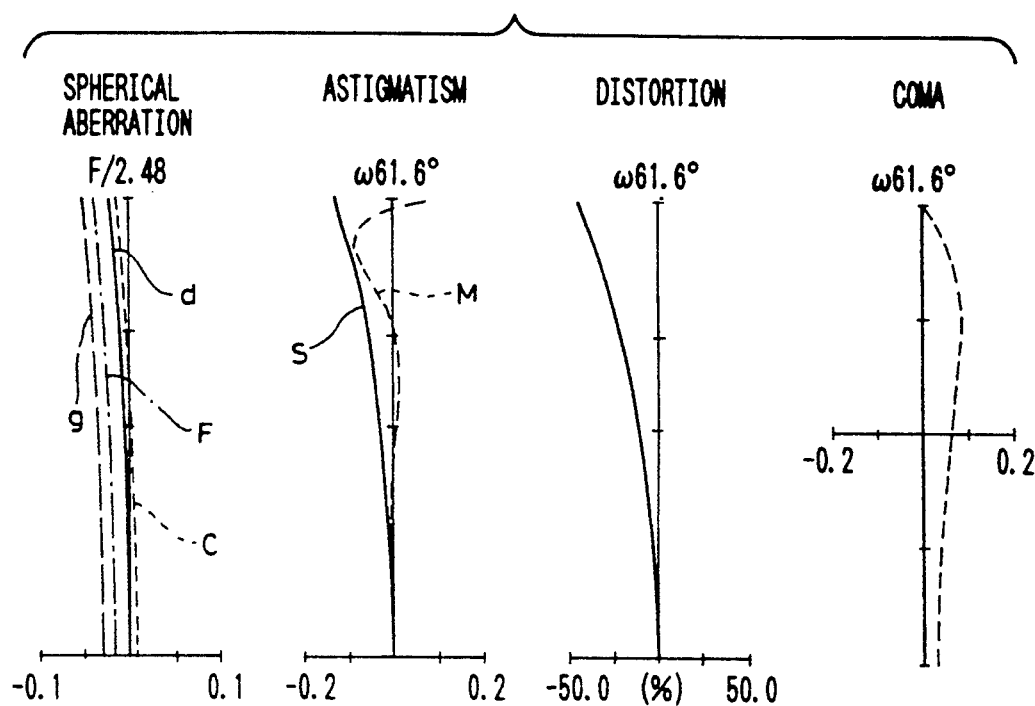
Figure 24:
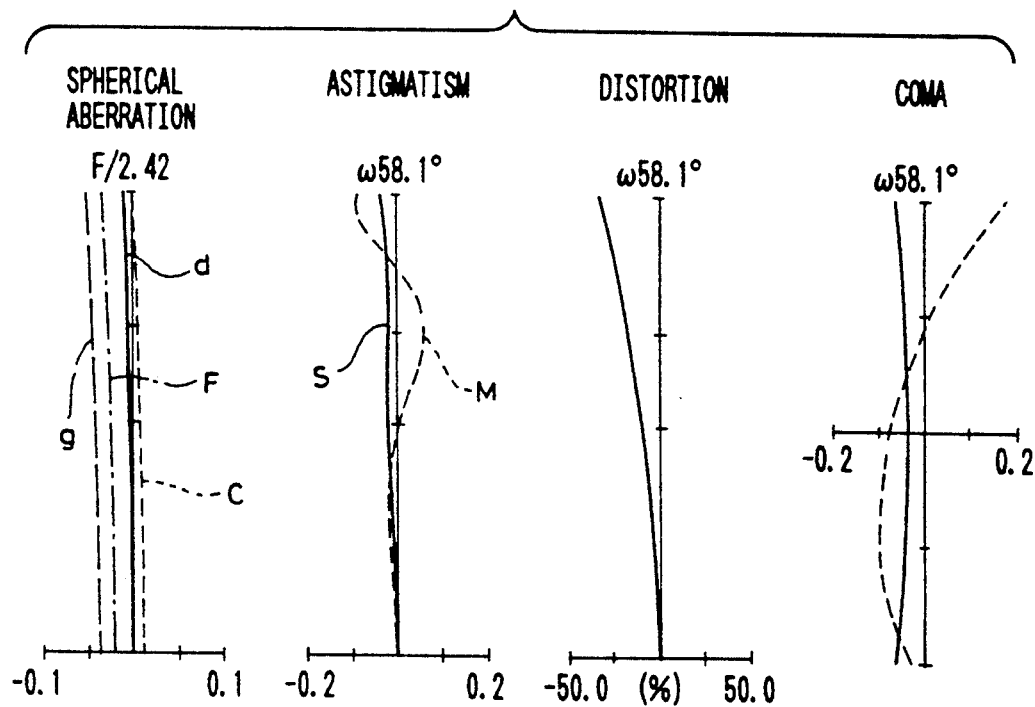
Figure 25:
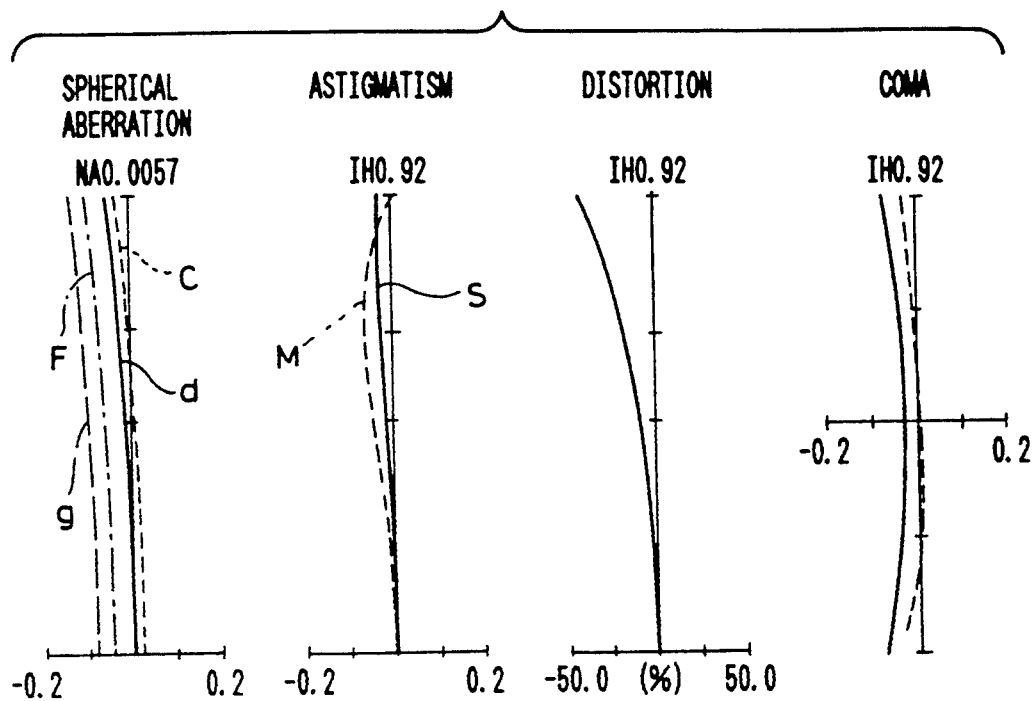
Figure 26:
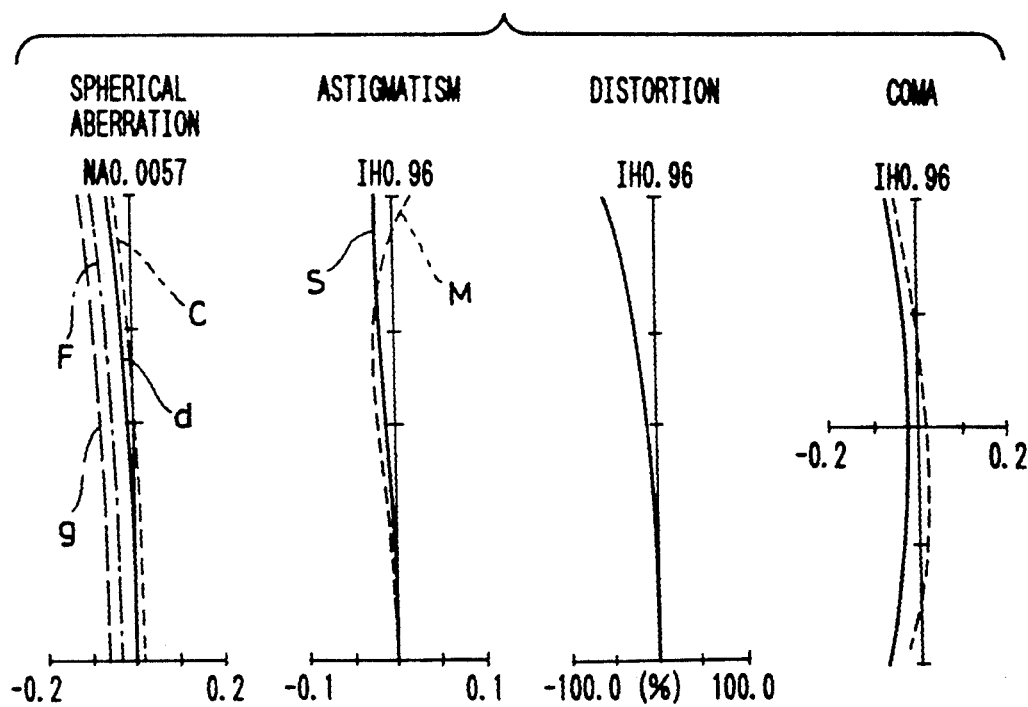
Figure 27:
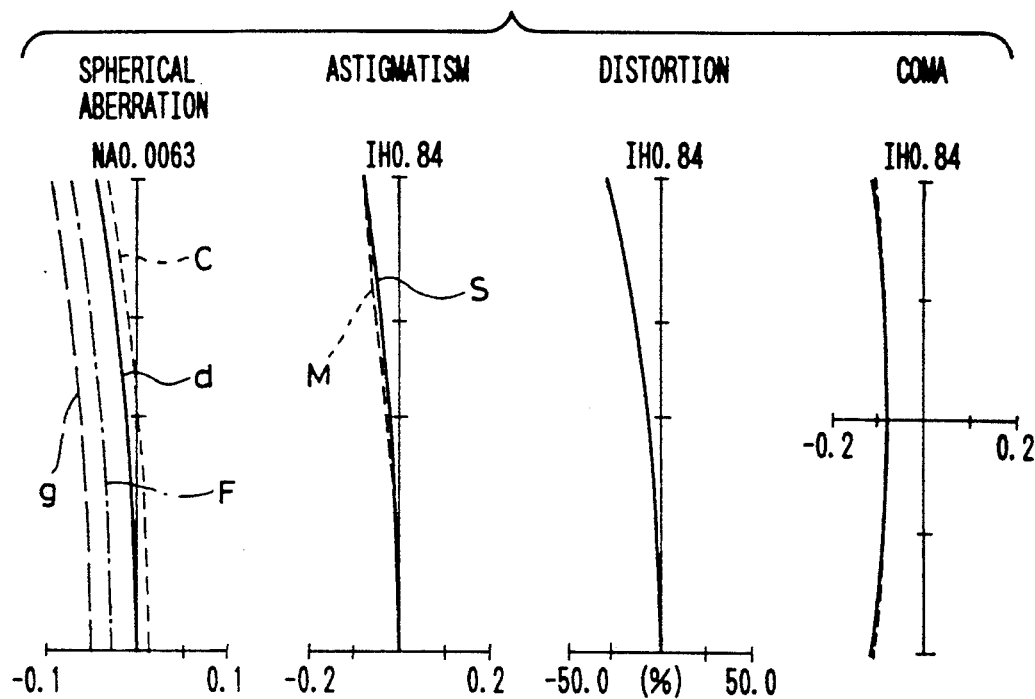
Figure 28:
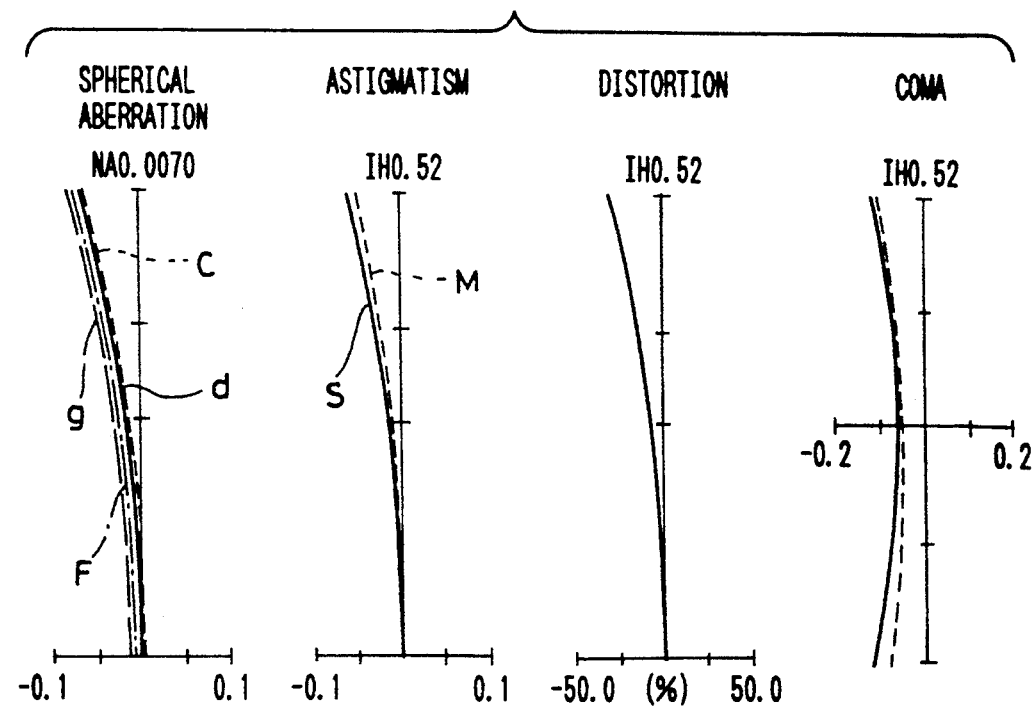
Figure 29:
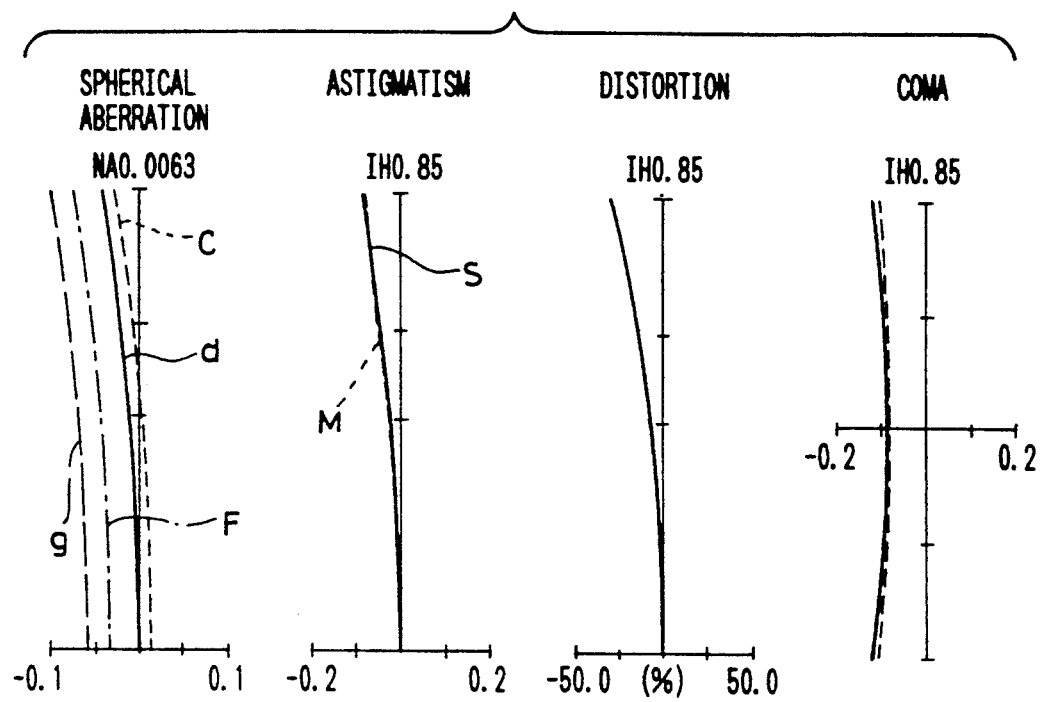
Figure 30:
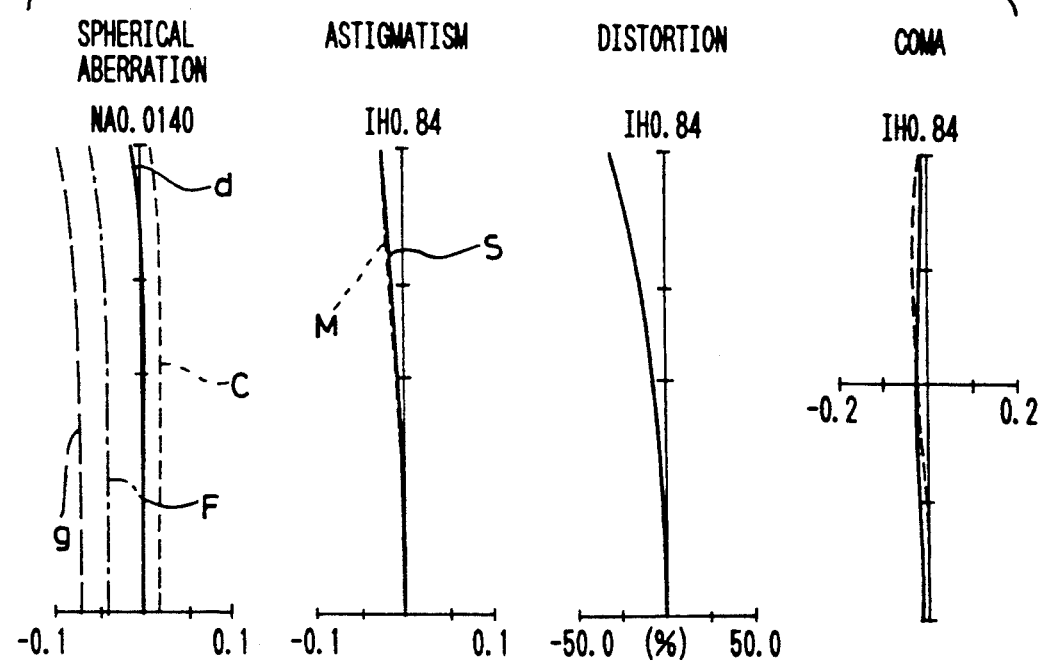
Figure 31:
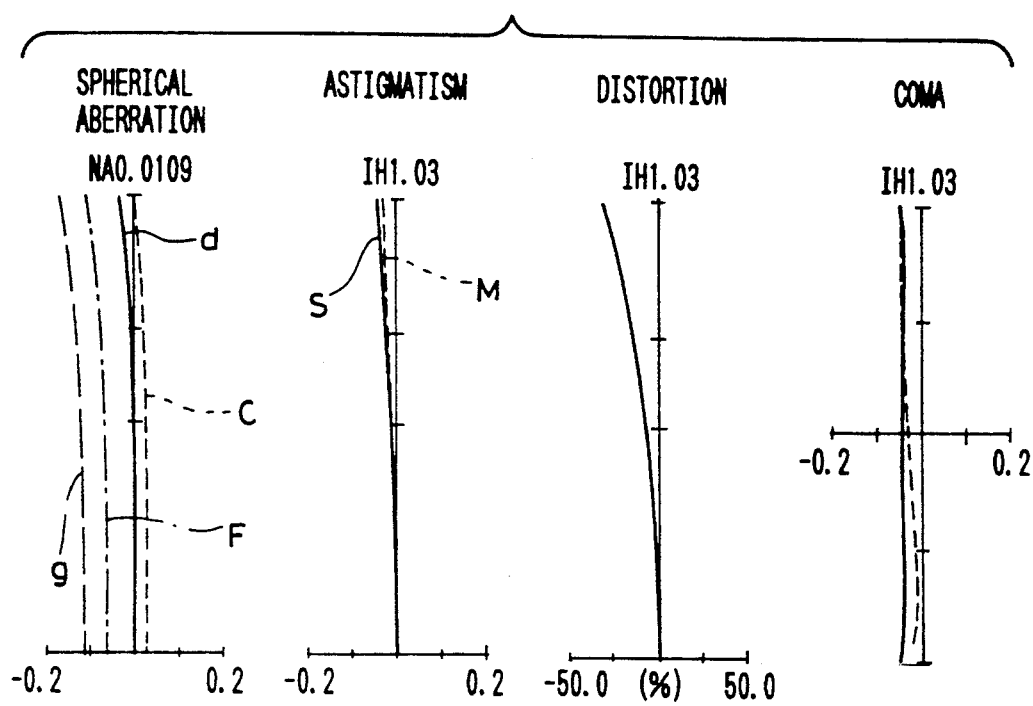
Figure 32:
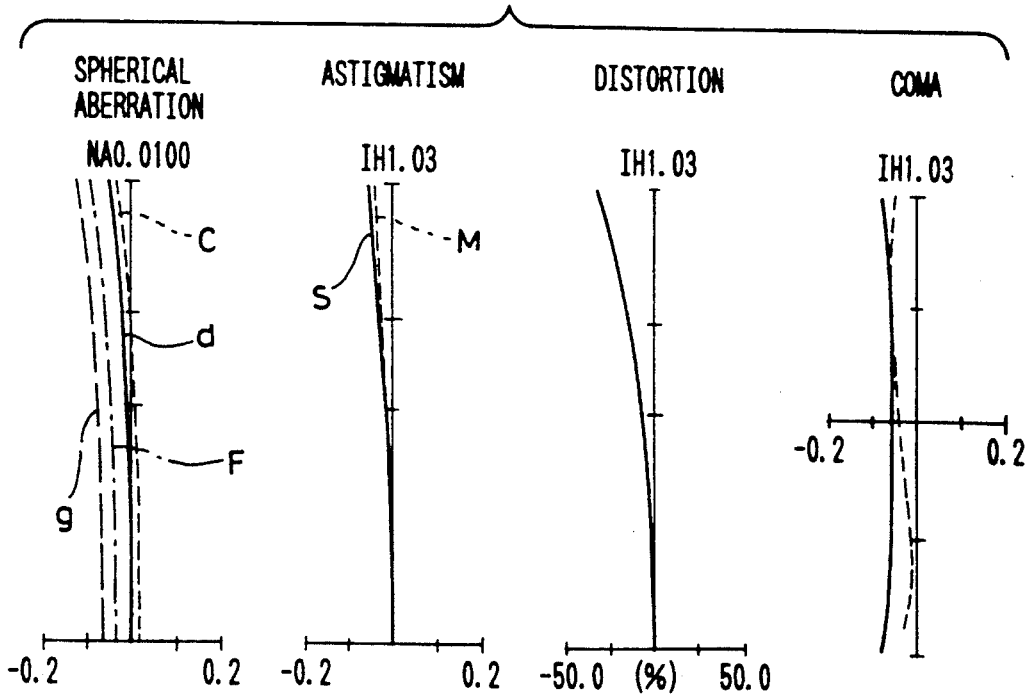
Figure 33:
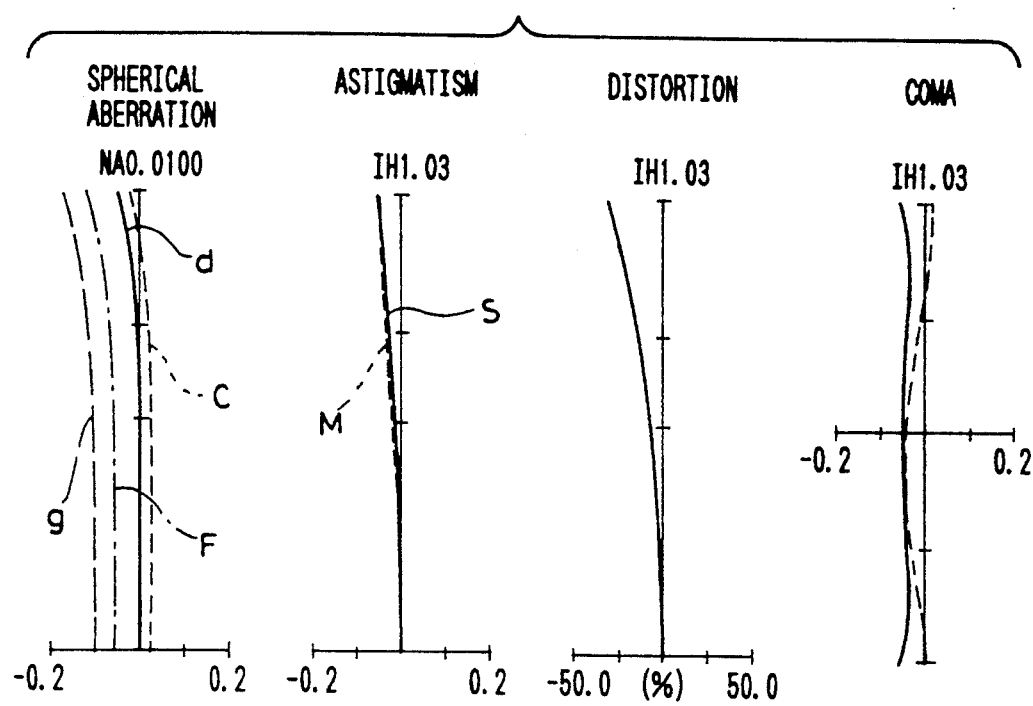
Figure 34:
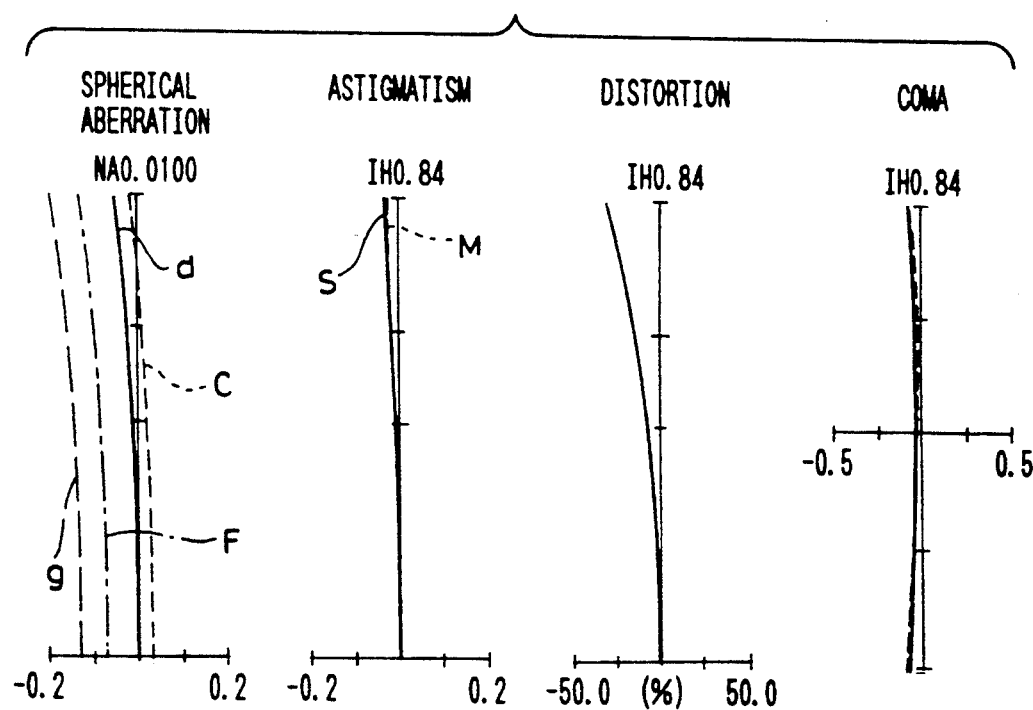
Figure 35:
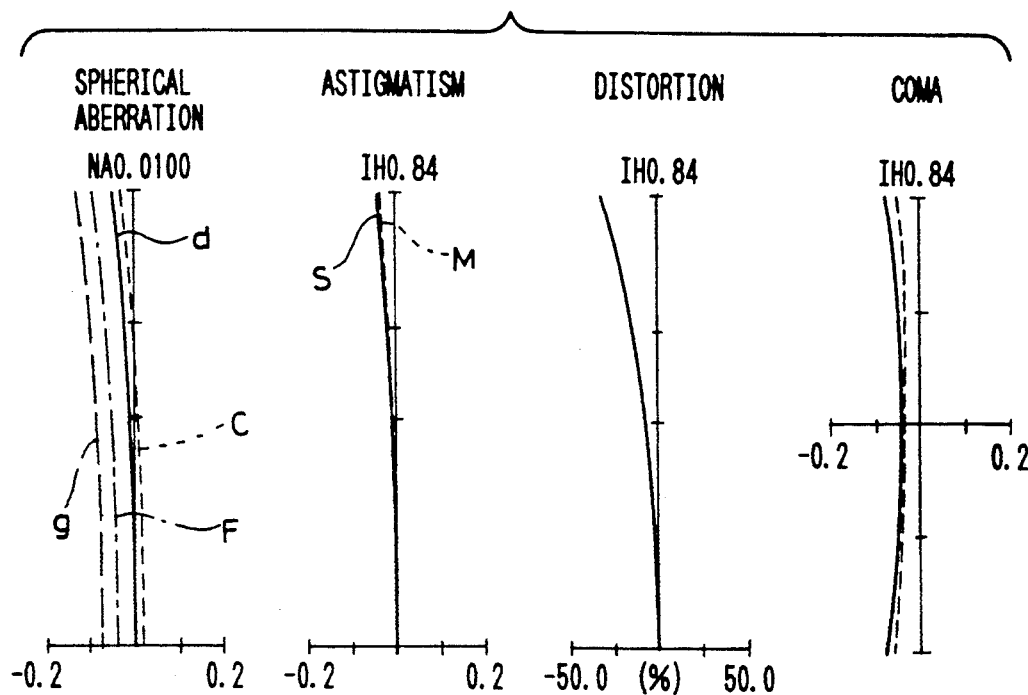
Figure 36:
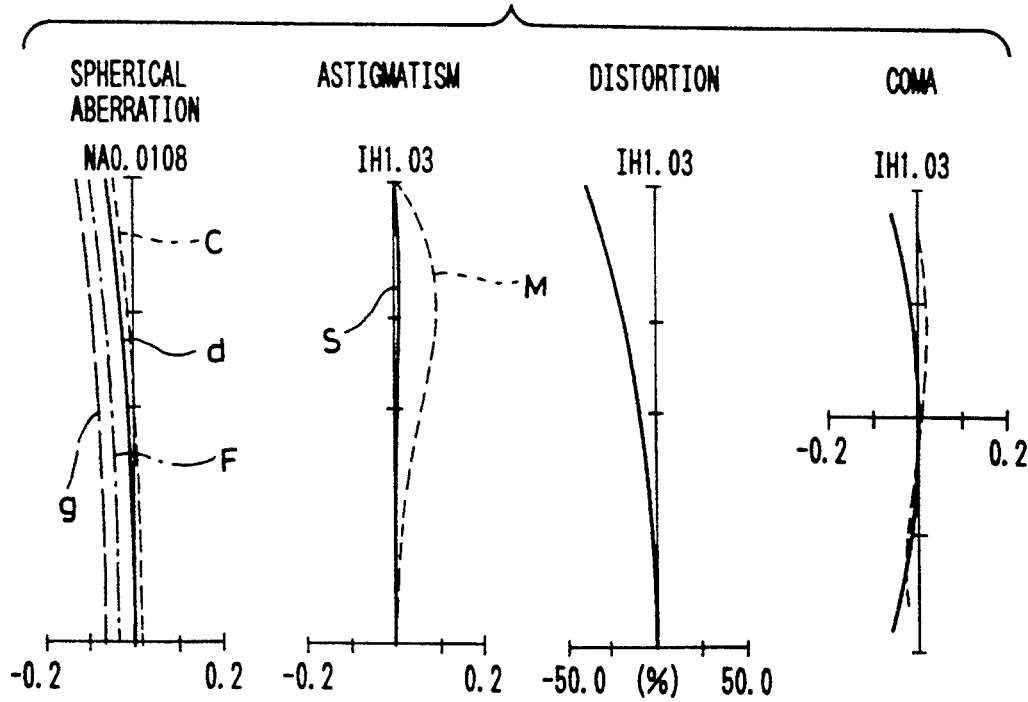

The thirteenth, fourteenth and eighteenth embodiments have the compositions illustrated in FIG. 13, FIG. 14 and FIG. 18 respectively, in each of which an aperture stop is arranged at a location which is close to an object side surface of the third lens unit and an aspherical surface is used at an adequate location.

In the thirteenth embodiment, the aspherical surface is used as an image side surface of the third lens unit. This aspherical surface is a convex surface which has curvature progressively lowered as portions of the aspherical surface are farther from the optical axis and a function of a concave surface at marginal portions thereof. Accordingly, this aspherical surface exhibits a converging function in the vicinity of the optical axis, a weak converging function for a light bundle having an intermediate NA and a diverging function at the marginal portions thereof, and serves for preventing the light bundle having the intermediate NA from producing spherical aberration and coma. In the thirteenth embodiment, aberrations produced by the first lens unit are corrected by the second lens unit and residual aberrations are corrected by the concave surface formed at the marginal portions of the aspherical surface formed on the third lens unit.

In the fourteenth embodiment, aspherical surfaces are used as an image side surface of the second lens unit and an object side surface of the third lens unit respectively. Out of these aspherical surfaces, the one used on the second lens unit is designed as a concave surface which has curvature progressively enhanced as portions of the aspherical surface are farther from the optical axis, whereas the aspherical surface adopted on the third lens unit is designed as a convex surface which has curvature progressively lowered as portions of the aspherical surface are farther from the optical axis.

In the fourteenth embodiment which uses the two aspherical surfaces having the shapes described above, the functions to correct the spherical aberration and coma are properly shared between the two aspherical surfaces, and aberrations are corrected favorably by using the aspherical surfaces which have relatively simple shapes and can be manufactured easily.

Figure 15:
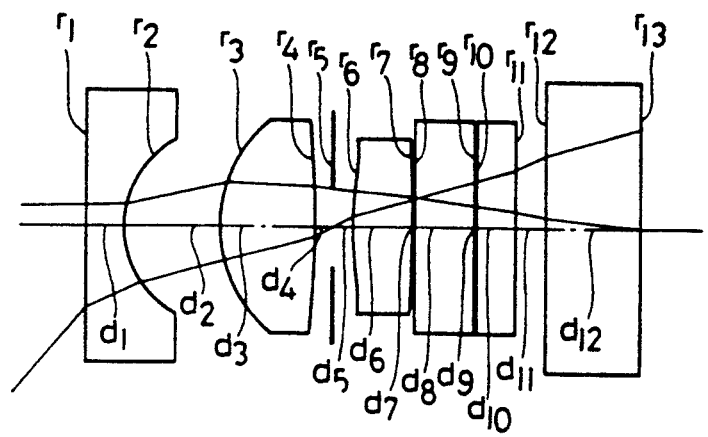

The fifteenth embodiment has the composition shown in FIG. 15, wherein an aperture stop is arranged nearly in the middle between the second lens unit and the third lens unit, and aspherical surfaces are adopted as an image side surface of the second lens unit and an object side surface of the third lens unit respectively.

The aspherical surface adopted as the image side surface of the second lens unit is a convex surface which has curvature progressively lowered as portions of the aspherical surface are farther from the optical axis, and the aspherical surface used as the object side surface of the third lens unit is also a convex surface which has curvature progressively lowered as portions of the aspherical surface are farther from the optical axis.

Figure 16:
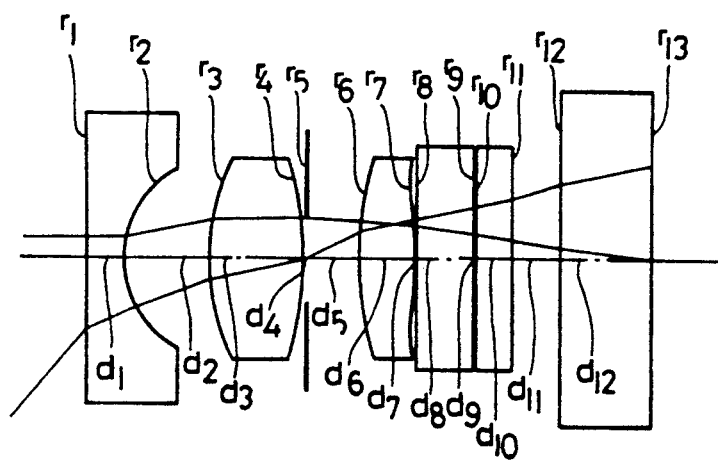
Figure 17:
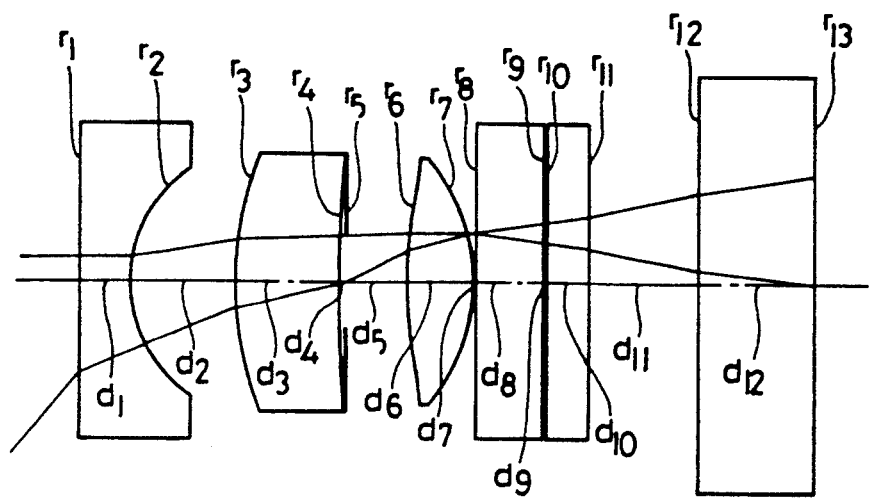

The sixteenth and seventeenth embodiments have the compositions shown in FIG. 16 and FIG. 17 respectively, in each of which an aperture stop is arranged at a location which is close to an image side surface of the second lens unit.

The sixteenth embodiment uses aspherical surfaces arranged as an image side surface of the second lens unit and an image side surface of the third lens unit respectively. Out of these aspherical surfaces, the aspherical surface arranged as the image side surface of the second lens unit has a shape of a convex surface which has curvature progressively enhanced as portions of the surface are farther from the optical axis, whereas the aspherical surface used as the image side surface of the third lens unit has a shape of a convex surface which has curvature lowered as portions of the surface are farther from the optical axis but exhibits a function of a concave surface at marginal portions thereof.

In cases of the objective lens systems preferred as the embodiments ninth through eleventh embodiments which have the compositions facilitating to reduce diameters of objective lens systems, curvature of field is corrected insufficiently as compared with the other aberrations.

In the sixteenth embodiment described above, the curvature of field is corrected simultaneously with the spherical aberration and coma by using the aspherical surfaces as the image side surface of the second lens unit and the image side surface of the third lens unit which is a little apart from the aperture stop.

The image side surface of the third lens unit is capable of correcting the curvature of field since the principal ray is rather high on this surface. However, since the principal ray is not so high on this surface as to allow sufficient correction of the curvature of field, the aspherical surface is designed so as to have a shape which has a large departure from a reference sphere thereof, or varies from convex to concave from the vicinity of the optical axis toward the marginal portion thereof. For this reason, the spherical aberration and coma are overcorrected. For favorably correcting these overcorrected aberrations, the second lens unit which has little influence on the principal ray has the image side surface designed as the aspherical surface producing the spherical aberration and coma, whereby aberrations are corrected favorably in the objective lens system as a whole.

The seventeenth embodiment is an objective lens system in which both the surfaces of the third lens unit are designed as aspherical surfaces.

The aspherical surface used as an object side surface is a convex surface having a shape which has curvature progressively lowered as portions of the surface are farther from the optical axis and the aspherical surface adopted as an image side surface of this lens unit has a shape similar to that of the aspherical surface used as the object side surface.

In the seventeenth embodiment, the effect similar to that of the aspherical surfaces used in the sixteenth embodiment is obtained by using the aspherical surfaces as the object side surface of the third lens unit and the image side surface thereof which is a little apart from an aperture stop, and the correcting functions for the spherical aberration, coma and curvature of field are properly shared between the aspherical surfaces which have relatively small departures from reference spheres thereof and can easily be manufactured in practice.

The eighteen embodiment is an objective lens system which is of the same type as the ninth embodiment but has a larger aperture diameter, and uses aspherical surfaces as an image side surface of the first lens unit and an object side surface of the second lens unit respectivelly.

The aspherical surface used as the image side surface of the first lens unit is a concave surface which has curvature progressively enhanced as portions of this surface are farther from the optical axis, whereas the aspherical surface adopted as the object side surface of the second lens unit is a convex surface which has curvature progressively lowered as portions of the surface are farther from the optical axis.

The image side surface of the first lens unit is designed for a ratio between a height of the principal ray and a height of the marginal ray of 2.9:1, and does not satisfy the condition (7) which defines a location of an aspherical surface. However, since the principal ray is high on the image side surface of the first lens unit as clarified by the above-mentioned ratio between the heights of the rays, the above-described shape of the aspherical surface, which refracts the rays more largely as the portions of the aspherical surface are farther from the optical axis, can favorably correct the curvature of field which cannot be corrected sufficiently in the ninth embodiment. The spherical aberration and coma are corrected by using the other aspherical surface which satisfies the condition (9).

As is understood from the foregoing description, the objective lens system for endoscopes according to the present invention has a short total length and favorably corrected aberrations. In the seventh through eighteenth embodiments of the present invention, in particular, each of the lens unit is composed of a single lens component.

When the optical axis is taken as the x axis, an intersection between a lens surface and the optical axis is taken as an origin, and a direction perpendicular to the optical axis is taken as the y axis, the shapes of the aspherical surfaces used in the embodiments are expressed by the following formula:

$$x = \frac{y^2/r}{1 + \sqrt{1 - p(y/r)^2}} + By^2 + Ey^4 + Fy^6 + Gy^8 + Hy^{10} + Iy^{12} + \ldots$$

wherein the reference symbol r represents a radius of curvature of a circle which is in contact with an aspherical surface in the vicinity of the optical axis, the reference symbol p designates a conical constant, and the reference symbols B, E, F, G, H, I, ... denote aspherical surface coefficients of the second, fourth, sixth, eighth, tenth, twelfth, ... orders respectively.

In the embodiments described above, the first through sixth embodiments adopt $h_{ai}$, $h_{bi}$, $u_i'$, $I_i$ and $I_i'$ which have the values listed below:

Embodiment 1
paraxial marginal ray

| k | $h_{ai}$ | $u_i$ | $I_i$ |
|---|---|---|---|
| 0 | 0.000000 | −0.012906 | |
| 1 | 0.178322 | −0.007808 | 0.014971 |
| 2 | 0.182368 | −0.127348 | 0.231518 |
| 3 | 0.281205 | −0.127348 | 0.127348 |
| 4 | 0.281336 | −0.043300 | 0.199315 |
| 5 | 0.371670 | 0.080950 | −0.170401 |
| 6 | 0.350698 | 0.124500 | 0.127895 |
| 7 | 0.004423 | 0.120717 | −0.124500 |
| 8 | 0.003105 | 0.188783 | −0.120717 | paraxial principal ray

| k | $h_{bi}$ | $u_i'$ | $I_i'$ |
|---|---|---|---|
| 0 | −15.410584 | −1.049522 | |
| 1 | −0.909416 | −0.695732 | 1.038991 |
| 2 | −0.548933 | −0.707277 | 0.022359 |
| 3 | 0.000000 | −0.707277 | 0.707277 |
| 4 | 0.000726 | −0.408951 | 0.707463 |
| 5 | 0.853892 | −0.349148 | −0.082016 |
| 6 | 0.944344 | −0.038765 | 0.911517 |
| 7 | 1.052163 | −0.037587 | 0.038765 |
| 8 | 1.052574 | −0.058781 | 0.037587 |

Embodiment 2
paraxial marginal ray

| k | $h_{ai}$ | $u_i$ | $I_i$ |
|---|---|---|---|
| 0 | 0.000000 | −0.012906 | |
| 1 | 0.178015 | −0.007808 | 0.014971 |
| 2 | 0.182054 | −0.120445 | 0.218150 |
| 3 | 0.286301 | −0.120445 | 0.120445 |
| 4 | 0.286903 | −0.040854 | 0.188747 |
| 5 | 0.370728 | 0.080974 | −0.167079 |
| 6 | 0.349787 | 0.124622 | 0.128183 |
| 7 | 0.001431 | 0.120836 | −0.124622 |
| 8 | 0.000114 | 0.188968 | −0.120836 | paraxial principal ray

| k | $h_{bi}$ | $u_i'$ | $I_i'$ |
|---|---|---|---|
| 0 | −15.399097 | −1.046844 | |
| 1 | −0.959871 | −0.694171 | 1.035709 |
| 2 | −0.600817 | −0.694171 | −0.000001 |
| 3 | 0.000000 | −0.694171 | 0.694171 |
| 4 | 0.003471 | −0.401101 | 0.694997 |
| 5 | 0.826462 | −0.355571 | −0.062442 |
| 6 | 0.918420 | −0.047493 | 0.904745 |
| 7 | 1.051179 | −0.046051 | 0.047493 |
| 8 | 1.051681 | −0.072016 | 0.046051 |

Embodiment 3
paraxial marginal ray

| k | $h_{ai}$ | $u_i$ | $I_i$ |
|---|---|---|---|
| 0 | 0.000000 | −0.011395 | |
| 1 | 0.196813 | −0.006739 | 0.013675 |
| 2 | 0.200304 | −0.137087 | 0.252452 |
| 3 | 0.318462 | −0.137087 | 0.137087 |
| 4 | 0.318603 | −0.045400 | 0.217432 |
| 5 | 0.406285 | 0.091831 | −0.188204 |
| 6 | 0.366634 | 0.136049 | 0.129857 |
| 7 | 0.004776 | 0.131916 | −0.136049 |
| 8 | 0.003336 | 0.206295 | −0.131916 | paraxial principal ray

| k | $h_{bi}$ | $u_i'$ | $I_i'$ |
|---|---|---|---|
| 0 | −19.072572 | −1.049370 | |
| 1 | −0.948742 | −0.695787 | 1.038383 |
| 2 | −0.588230 | −0.682469 | −0.025792 |
| 3 | 0.000000 | −0.682469 | 0.682469 |
| 4 | 0.000701 | −0.394608 | 0.682646 |
| 5 | 0.762822 | −0.362528 | −0.043995 |
| 6 | 0.919354 | −0.049794 | 0.918423 |
| 7 | 1.051792 | −0.048281 | 0.049794 |
| 8 | 1.052320 | −0.075503 | 0.048281 |

Embodiment 4
paraxial marginal ray

| k | $h_{ai}$ | $u_i$ | $I_i$ |
|---|---|---|---|
| 0 | 0.000000 | −0.011395 | |
| 1 | 0.176948 | −0.006739 | 0.013675 |
| 2 | 0.180087 | −0.137087 | 0.252452 |
| 3 | 0.286319 | −0.137087 | 0.137087 |
| 4 | 0.286446 | −0.045400 | 0.217432 |
| 5 | 0.365278 | 0.091831 | −0.188204 |
| 6 | 0.329629 | 0.136049 | 0.129857 |
| 7 | 0.118373 | 0.099316 | −0.205351 |
| 8 | 0.041264 | 0.117277 | −0.099316 | paraxial principal ray

| k | $h_{bi}$ | $u_i'$ | $I_i'$ |
|---|---|---|---|
| 0 | −15.245533 | −0.932973 | |
| 1 | −0.758370 | −0.618610 | 0.923205 |
| 2 | −0.470198 | −0.606770 | −0.022932 |
| 3 | 0.000000 | −0.606770 | 0.606770 |
| 4 | 0.000560 | −0.350838 | 0.606927 |
| 5 | 0.609756 | −0.322317 | −0.039115 |
| 6 | 0.734879 | −0.044270 | 0.816551 |
| 7 | 0.803622 | −0.120511 | −0.426214 |
| 8 | 0.897187 | −0.142306 | 0.120511 |

Embodiment 5
paraxial marginal ray

| k | $h_{ai}$ | $u_i$ | $I_i$ |
|---|---|---|---|
| 0 | 0.000000 | −0.011395 | |
| 1 | 0.189924 | 0.000245 | 0.034186 |
| 2 | 0.189802 | −0.095078 | 0.184617 |
| 3 | 0.294554 | −0.095078 | 0.095078 |
| 4 | 0.294554 | −0.007687 | 0.207243 |
| 5 | 0.309088 | 0.111647 | −0.163658 |
| 6 | 0.278156 | 0.132791 | 0.062097 |
| 7 | 0.001357 | 0.128757 | −0.132791 |
| 8 | 0.000001 | 0.201356 | −0.128757 | paraxial principal ray

| k | $h_{bi}$ | $u_i'$ | $I_i'$ |
|---|---|---|---|
| 0 | −17.965483 | −1.010614 | |
| 1 | −1.121921 | −0.712330 | 0.875983 |
| 2 | −0.765756 | −0.695034 | −0.033499 |
| 3 | 0.000000 | −0.695034 | 0.695034 |
| 4 | 0.000000 | −0.401949 | 0.695034 |
| 5 | 0.759994 | −0.387832 | −0.019360 |
| 6 | 0.867441 | −0.071271 | 0.929659 |
| 7 | 1.016004 | −0.069106 | 0.071271 |
| 8 | 1.016732 | −0.108071 | 0.069106 |

Embodiment 6
paraxial marginal ray

| k | $h_{ai}$ | $u_i$ | $I_i$ |
|---|---|---|---|
| 0 | 0.000000 | −0.011395 | |
| 1 | 0.196813 | −0.003635 | 0.022791 |
| 2 | 0.198696 | −0.132996 | 0.250540 |
| 3 | 0.320006 | −0.132996 | 0.132996 |
| 4 | 0.320143 | −0.046793 | 0.204425 |
| 5 | 0.413640 | 0.089478 | −0.186888 |
| 6 | 0.374047 | 0.136455 | 0.137957 |
| 7 | 0.005069 | 0.132309 | −0.136455 |
| 8 | 0.003624 | 0.206910 | −0.132309 | paraxial principal ray

| k | $h_{bi}$ | $u_i'$ | $I_i'$ |
|---|---|---|---|
| 0 | −19.130935 | −1.050336 | |
| 1 | −0.990415 | −0.712210 | 0.992991 |
| 2 | −0.621395 | −0.681255 | −0.059951 |
| 3 | 0.000000 | −0.681255 | 0.681255 |
| 4 | 0.000700 | −0.393915 | 0.681411 |
| 5 | 0.787783 | −0.356629 | −0.051135 |
| 6 | 0.945590 | −0.039412 | 0.931587 |
| 7 | 1.052160 | −0.038214 | 0.039412 |

| | | -continued | |
|---|---|---|---|
| 8 | 1.052578 | −0.059761 | 0.038214 |

We claim:

1. An objective lens system for endoscopes comprising, in order from the object side: a first lens unit having negative refractive power, a second lens unit having positive refractive power, and a third lens unit having positive refractive power and comprising an aspherical surface; and satisfying the following conditions (1) and (2):

$$0.05 < |A_{2SP}/A_{3AS}| < 20 \quad (1)$$

$$A_{2SP} < 0, A_{3AS} > 0 \quad (2)$$

wherein the reference symbol $A_{2SP}$ represents a quotient obtained by dividing an astigmatism coefficient of the third order of spherical surfaces of said second lens unit by an F number of said objective lens system, and the reference symbol $A_{3AS}$ designates a quotient obtained by dividing an astigmatism coefficient of the third order of the aspherical surface of said third lens unit by said F number.

2. An objective lens system for endoscopes according to claim 1 satisfying the condition shown below:

$$|f_{12}| < 10f$$

wherein the reference symbol $f_{12}$ represents a total focal length of said first lens unit and said second lens unit and the reference symbol f designates a focal length of said objective lens system as a whole.

3. An objective lens system for endoscopes according to claim 1 satisfying the condition shown below:

$$15f > R_2 > 0$$

wherein the reference symbol $R_2$ represents a radius of curvature on an object side surface of said second lens unit and the reference symbol f designates a focal length of said objective lens system as a whole.

4. An objective lens system for endoscopes according to claim 1 satisfying the condition shown below:

$$0 \leq S_K \leq f$$

wherein the reference symbol $S_K$ represents a distance as measured from a final surface of said objective lens system to an image plane thereof and the reference symbol f designates a focal length of said objective lens system as a whole.

5. An objective lens system for endoscopes according to claim 4 satisfying the conditions shown below:

$$D_3 > 0.5f$$

$$0 < f_2 < 7f$$

$$0 < f_3 < 21f$$

wherein the reference symbol $D_3$ represents thickness of a final lens component arranged in said third lens unit, and the reference symbols $f_2$ and $f_3$ designate focal lengths of said second unit and said third lens unit respectively.

* * * * *